US012475389B2

(12) United States Patent
Nonaka et al.

(10) Patent No.: US 12,475,389 B2
(45) Date of Patent: Nov. 18, 2025

(54) TRAINING DATA GENERATION DEVICE, RECORDING METHOD, AND INFERENCE DEVICE

(71) Applicant: OLYMPUS CORPORATION, Hachioji (JP)

(72) Inventors: Osamu Nonaka, Hachioji (JP); Toshiyuki Fujii, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 494 days.

(21) Appl. No.: 17/894,453

(22) Filed: Aug. 24, 2022

(65) Prior Publication Data

US 2022/0405622 A1   Dec. 22, 2022

Related U.S. Application Data

(63) Continuation of application No. PCT/JP2020/007868, filed on Feb. 26, 2020.

(51) Int. Cl.
*G06N 5/04* (2023.01)
*G06T 5/90* (2024.01)
(Continued)

(52) U.S. Cl.
CPC ............... *G06N 5/04* (2013.01); *G06T 5/90* (2024.01); *G06V 10/14* (2022.01); *G06V 10/42* (2022.01); *G06V 10/774* (2022.01)

(58) Field of Classification Search
USPC .......................................................... 382/154
See application file for complete search history.

(56) References Cited

U.S. PATENT DOCUMENTS

| 2009/0307618 | A1* | 12/2009 | Lawler | .................. | G06F 40/169 |
| | | | | | 715/764 |
| 2010/0135562 | A1* | 6/2010 | Greenberg | ............. | G16H 30/20 |
| | | | | | 382/254 |

(Continued)

FOREIGN PATENT DOCUMENTS

| JP | 2013-117860 A | 6/2013 |
| JP | 2013-152423 A | 8/2013 |
| JP | 2019-117577 A | 7/2019 |

OTHER PUBLICATIONS

International Search Report dated Jun. 2, 2020, issued in counterpart International Application No. PCT/JP2020/007868 (2 pages).

*Primary Examiner* — Chineyere Wills-Burns
*Assistant Examiner* — Aaron Timothy Bonansinga
(74) *Attorney, Agent, or Firm* — WHDA, LLP

(57) ABSTRACT

A training data generation device includes a computer, and a computer-readable storage medium. The computer is configured to: receive an input of an annotation for second image data obtained by imaging an observation target; reflect a result of the annotation in first image data that is related to the same observation target as the observation target of the second image data, the first image data having a different at least one of imaging mode and display mode from the second image data; and generate training data for creating an inference model by using the first image data and the result of the annotation reflected in the first image data, the first image data including image data of a plurality of images, and the second image data being image data of an image obtained by combining the plurality of images included in the first image data.

9 Claims, 20 Drawing Sheets

(51) Int. Cl.
*G06V 10/14* (2022.01)
*G06V 10/42* (2022.01)
*G06V 10/774* (2022.01)

(56) References Cited

U.S. PATENT DOCUMENTS

| | | | |
|---|---|---|---|
| 2014/0298153 A1* | 10/2014 | Tsujimoto | G06F 3/04845 |
| | | | 715/232 |
| 2017/0199120 A1* | 7/2017 | Liu | G01N 21/3554 |
| 2019/0122378 A1* | 4/2019 | Aswin | G06T 7/20 |
| 2019/0197669 A1* | 6/2019 | Sakamoto | G06V 20/58 |
| 2020/0211692 A1* | 7/2020 | Kalafut | G16H 30/40 |
| 2021/0073977 A1* | 3/2021 | Carter | G06T 11/20 |
| 2022/0215653 A1* | 7/2022 | Inoshita | G06V 10/772 |

* cited by examiner

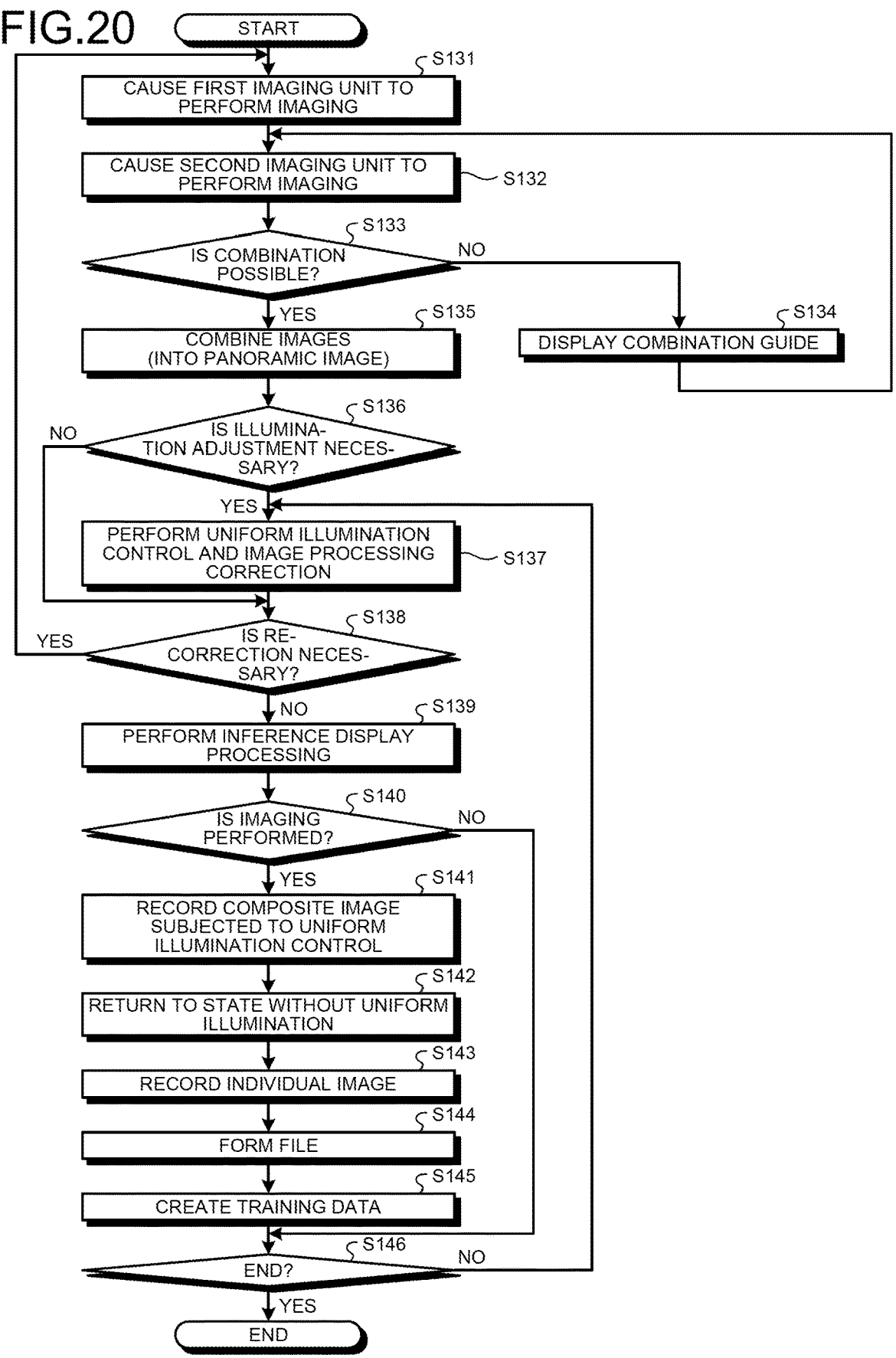

TRAINING DATA GENERATION DEVICE, RECORDING METHOD, AND INFERENCE DEVICE

CROSS-REFERENCE TO RELATED APPLICATION

This application is a continuation of International Application No. PCT/JP2020/007868, filed on Feb. 26, 2020, the entire contents of which are incorporated herein by reference.

BACKGROUND

1. Technical Field

The present disclosure relates to a training data generation device, a recording method, and an inference device for an assistance technology that utilizes artificial intelligence (AI) based on image data.

2. Related Art

In recent years, there has been developed a technology for assisting determination that has been made with visual recognition by a human, by utilizing artificial intelligence (AI) based on image data.

In order to implement the above AI, a large amount of training data, which is an input/output data set serving as an answer, is prepared in advance, and a technology called deep learning is often combined. In deep learning, first, "learning" for calculating a weight for appropriately deriving a solution to an unknown input is performed using training data, and "inference" for deriving a solution to an input is performed using the weight calculated by the learning.

JP 2013-117860 A proposes a technology for automatically determining and classifying an input image.

Specifically, a technology has been proposed in which an image is divided into a plurality of regions, and an object in each region is classified using a histogram or feature data to label the image.

SUMMARY

In some embodiments, a training data generation device includes a computer, and a computer-readable storage medium. The computer is configured to: receive an input of an annotation for second image data obtained by imaging an observation target; reflect a result of the annotation in first image data that is related to the same observation target as the observation target of the second image data, the first image data having a different at least one of imaging mode and display mode from the second image data; and generate training data for creating an inference model by using the first image data and the result of the annotation reflected in the first image data, the first image data including image data of a plurality of images, and the second image data being image data of an image obtained by combining the plurality of images included in the first image data.

In some embodiments, a recording method includes: performing image combining processing to display, on a display, a plurality of pieces of image data obtained by imaging an observation target; acquiring annotation coordinate information on a display image of composite image data displayed on the display; adding the annotation coordinate information to individual image data constituting the composite image data displayed on the display; creating an image file including the annotation coordinate information for the individual image data as metadata; and recording the created image file.

In some embodiments, an inference device includes: a computer-readable storage medium storing a trained model that has been trained using training data; and a computer configured to: receive an input of an annotation for second image data obtained by imaging an observation target; reflect a result of the annotation in first image data that is related to the same observation target as the observation target of the second image data, the first image data having a different at least one of imaging mode and display mode from the second image data; generate training data for creating an inference model by using the first image data and the result of the annotation reflected in the first image data; and perform inference processing on first image data based on the trained model that has been trained using the training data generated, the first image data including image data of a plurality of images, and the second image data being image data of an image obtained by combining the plurality of images included in the first image data.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 20 is a flowchart illustrating an outline of processing performed by an observation system according to a fourth modified example when generating training data.

DETAILED DESCRIPTION

Hereinafter, embodiments of a training data generation device for generating training data, a training data generation method, a recording device, and a recording method according to the disclosure will be described with reference to the drawings. Note that the disclosure is not limited by these embodiments. In the following embodiments, an example of using an image captured by an endoscope will be described, but the disclosure can be generally applied to a training data generation device, a training data generation method, a recording device, and a recording method.

In addition, in the description of the drawings, the same or corresponding elements are appropriately denoted by the same reference signs. In addition, it should be noted that the drawings are schematic, and a dimensional relationship of each element, a ratio of each element, and the like may be different from actual ones. The drawings may include portions having different dimensional relationships and ratios.

First Embodiment

Configuration of Observation System

Figure 1:
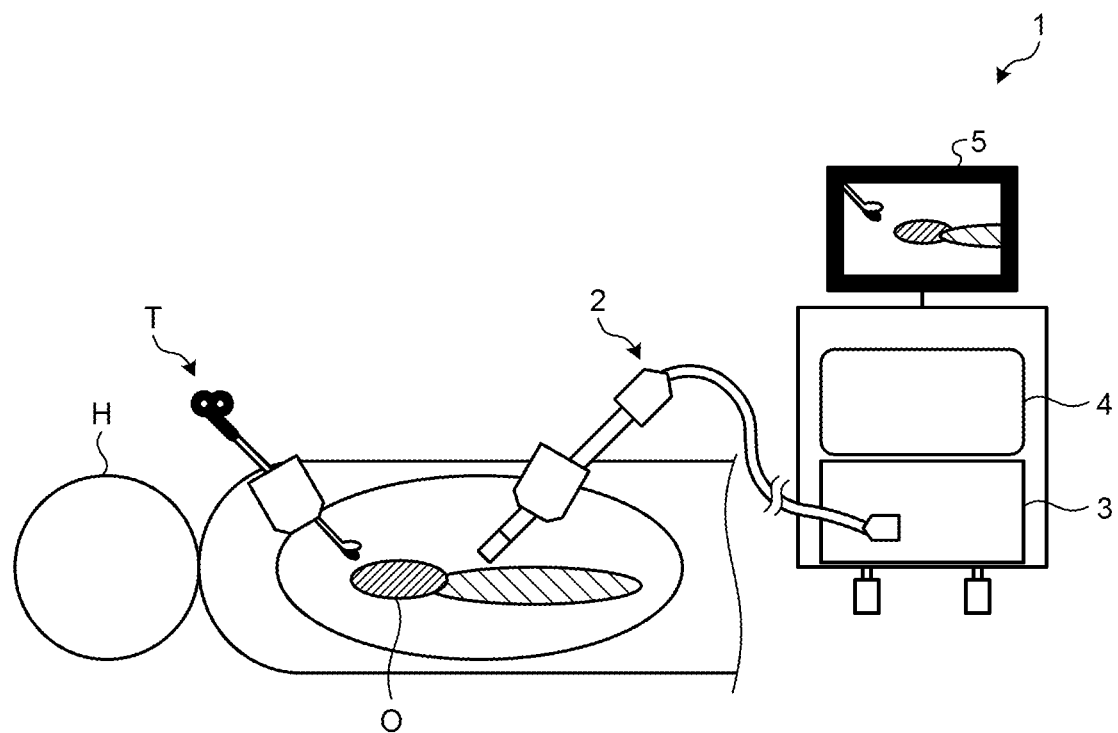
FIG. 1 is a schematic diagram illustrating a configuration of an observation system according to a first embodiment.

First, assuming a medical field, a configuration of a system for observing the inside of a body (abdominal cavity) by using an endoscope (such as a rigid endoscope) will be described. FIG. 1 is a schematic diagram illustrating a configuration of an observation system according to a first embodiment. As illustrated in FIG. 1, an observation system 1 according to the first embodiment observes an observation target O such as a tumor in a subject H. Endoscopic surgery can be performed by observing the observation target O in the subject H with the observation system 1 and performing treatment on the subject H with a treatment tool T.

Figure 2:
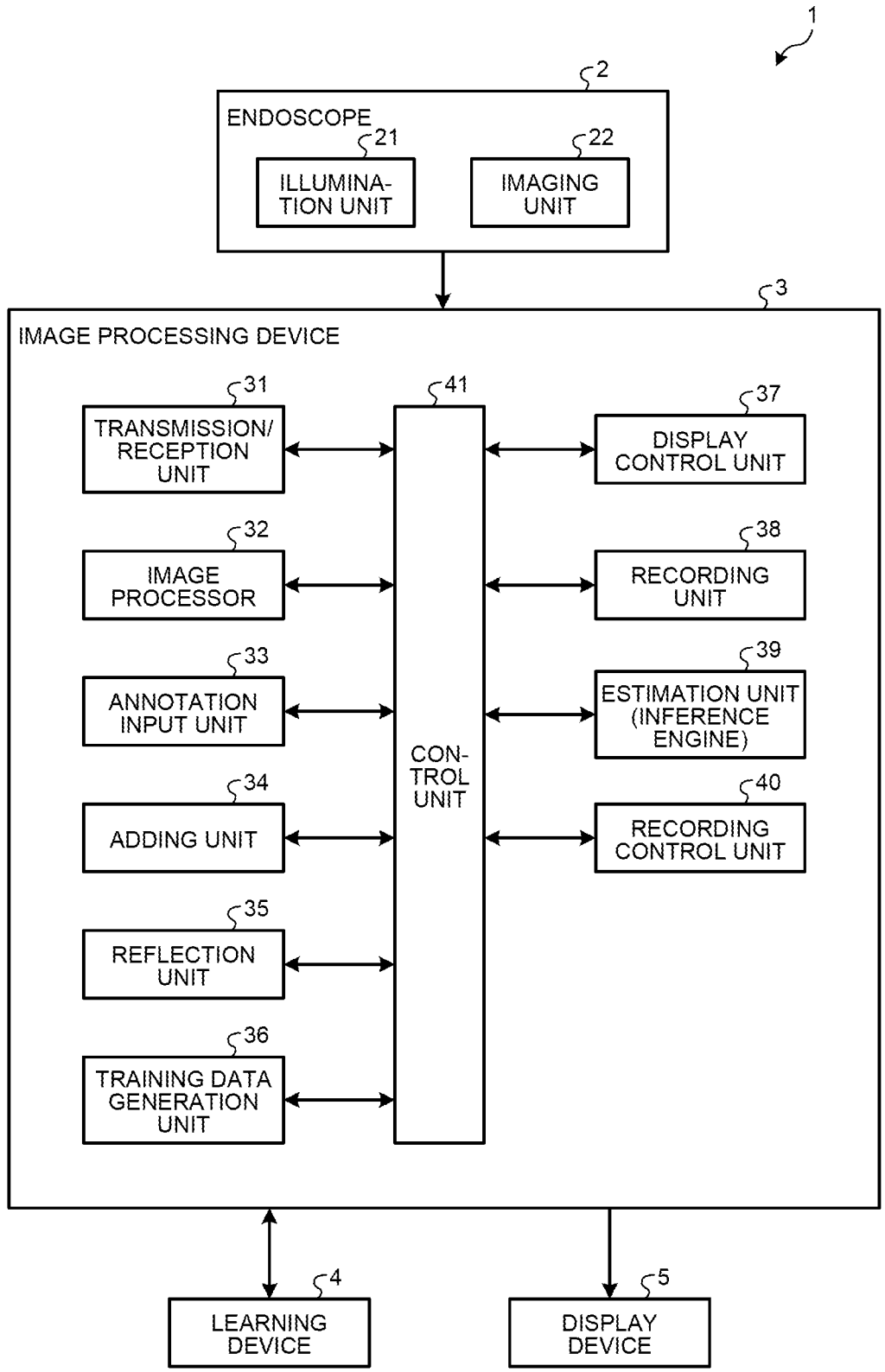
FIG. 2 is a block diagram illustrating a configuration of the observation system according to the first embodiment.

FIG. 2 is a block diagram illustrating a configuration of the observation system according to the first embodiment. As illustrated in FIG. 2, the observation system 1 includes an endoscope (including an optical system and an imaging unit) 2, an image processing device 3, a learning device 4, and a display device (display unit) 5. Some of these devices may be configured using cloud computing, and each device may be connected by a network such as the Internet. That is, it is not necessary that all the components are accommodated in one casing.

In the observation system 1, the image processing device 3 serving as a training data generation device and a recording device generates training data by using an image captured by the endoscope 2, and the learning device 4 performs machine learning such as deep learning by using the training data. The learning device 4 generates an inference model for detecting the observation target O such as a tumor from an image captured by the endoscope 2 by machine learning, for example. Then, the image processing device 3 automatically detects a tumor from the image captured by the endoscope 2 by using the inference model generated by the learning device 4, and superimposes a mark or the like representing the tumor on the image and displays the superimposed image on the display device 5. As a result, an operator such as a doctor can easily find the tumor. Note that the learning device 4 may be a server connected via a line such as the Internet.

The endoscope 2 is a rigid endoscope in which an illumination unit 21 and an imaging unit 22 are arranged at a distal end of a rigid insertion portion. However, the endoscope 2 may be an endoscope in which an illumination unit and an imaging unit are arranged at a distal end of a flexible insertion portion.

The illumination unit 21 irradiates the observation target O with illumination light emitted from a light source device.

The imaging unit 22 includes an imaging element implemented using a charge coupled device (CCD) image sensor or complementary metal oxide semiconductor (CMOS) image sensor, an A/D conversion circuit, or the like, and captures an image of the observation target O. Image data of an image captured by the imaging unit 22 is transmitted to the image processing device 3.

The image processing device 3 includes a transmission/reception unit 31, an image processor 32, an annotation input unit 33, an adding unit 34, a reflection unit 35, a training data generation unit 36, a display control unit 37, a recording unit 38, an estimation unit 39, a recording control unit 40, and a control unit 41.

The transmission/reception unit 31 performs wireless or wired communication with an external device such as the endoscope 2 or the learning device 4 to transmit and receive various signals.

The image processor 32 performs image processing such as gamma correction, white balance adjustment, color correction, noise reduction, or image enhancement processing on an image captured by the endoscope 2. The image processor 32 is implemented using a general-purpose processor such as a central processing unit (CPU) or a dedicated processor such as various arithmetic circuits that execute specific functions such as an application specific integrated circuit (ASIC).

Note that, in the gamma correction, since luminance correction is made in such a way as to be suitable for human eyes, it is easy for a human to perform observation, but information of an original image may be damaged. Therefore, there is a possibility that it is preferable to use an image that has not been subjected to gamma correction in AI that finds even information that cannot be sensorially discriminated by a human and performs inference. From this point as well, data preferred by a human and data preferred by a machine do not necessarily match each other. Therefore, training data selected by a human is not always optimal as it is for use in machine learning or the like.

Similarly, an example in which training data selected by a human is not always optimal will be described below. For example, the white balance adjustment is made in such a way as to be suitable for human eyes, so that it becomes easy for a human to perform observation, but information of an original image such as balance information of each color of RGB may be damaged. Therefore, in some cases, it is preferable to use an image that is not subjected to the white balance adjustment as training data used for machine learning. Then, inputting optical characteristics of a light source of the illumination unit 21 and an imaging element of the imaging unit 22 to the learning device 4, instead of the white balance information, may make the inference model be more highly accurate in an AI technology in which multimodal learning is performed. Note that the multimodal learning means that AI performs machine learning by using a plurality of types of data, and it is possible to improve the accuracy of the inference model by similarly using a plurality of types of data at the time of inference.

In color or contrast correction, since the color or contrast is corrected in such a way as to be suitable for human eyes, it is easy for a human to perform observation, but there is also a possibility that information of an original image is damaged. Therefore, in some cases, it is preferable to use an image that is not subjected to the color or contrast correction for machine learning. Then, inputting a spectral characteristic of the imaging element of the imaging unit 22 to the learning device 4, instead of the color or contrast correction information, may make the inference model be more highly accurate in an AI technology such as multimodal learning (a technology of performing learning using a plurality of types of data and performing processing in an integrated manner).

Since noise reduction removes noise that is not useful for observation, it is easy for a human to perform observation, but the noise reduction affects information other than noise, and information of an original image may be damaged. Therefore, in some cases, it is preferable to use an image that is not subjected to noise reduction or is subjected to weak noise reduction for machine learning. Furthermore, the learning device 4 can automatically remove and detect noise by machine learning.

Since the image enhancement processing highlights information useful for observation, it is easy for a human to perform observation. However, information of an original image for elements and components that a human has not noticed may be damaged. Therefore, it is also said that it is preferable to use an image that is not subjected to the image enhancement processing for machine learning. In addition, pixel sensitivity correction for the imaging element, distortion correction for an imaging lens, and the like are also important for visual recognition by a human, but at the time of using AI, it may be inappropriate because artificial manipulation is performed on information that a human does not care about.

The annotation input unit 33 receives an input of an annotation for second image data obtained by imaging the observation target O. Specifically, the annotation input unit 33 includes a mouse, a keyboard, a touch panel, and a speech recognition device, and receives an annotation input by a mouse operation, a keyboard, a touch operation, a speech input, or the like. The second image data is image data to be displayed on the display unit (display device 5) when annotation input is performed. The annotation input unit 33 is implemented by a general-purpose processor such as a CPU or a dedicated processor such as various arithmetic circuits that execute specific functions such as an ASIC.

The adding unit 34 adds, to image data, various annotation results obtained by a human such as an expert confirming and annotating an image. The adding unit 34 adds an annotation result received by the annotation input unit 33 to the second image data. Specifically, the term "adding" here refers to recording, by an expert or the like, an annotation result regarding target object information input by a mouse, a keyboard, a touch operation, a speech input, or the like, position information in a screen on which the target object is displayed or in a screen in which the target object appears, or the like, in association with image data while confirming an image displayed on the display device 5 with his/her eyes. The image data to which the annotation results (annotation information) are added is recorded in the recording unit 38. Various methods can be considered for this addition. For example, a method of preparing a corresponding data group in another folder and associating the data group with a data name or a file name, or a method of writing the annotation result as metadata in an image file may be used. As described above, the present application also has characteristics in creating and recording training data, and includes not only the aspects of the training data generation device and the training data generation method for generating the training data to be recorded but also the recording device and the recording method. Note that first image data is image data used by the AI for machine learning. Furthermore, an imaging mode represents an imaging content including the intensity and wavelength of light applied to the observation target O at the time of imaging, setting of an exposure time, a gain, and the like of the imaging element, a content of image processing for a captured image, and the like, and is, for example, processing with improved visibility at the time of displaying on the display unit (display device 5). In addition, the display mode represents a display content including, for example, combining images when a captured image is displayed on the display device 5. The adding unit 34 is implemented by a general-purpose processor such as a CPU or a dedicated processor such as various arithmetic circuits that execute the above-described specific association function such as an ASIC.

The reflection unit 35 reflects the annotation result in the first image data related to the same observation target O as that of the second image data and having a different imaging mode and/or display mode. Specifically, the reflection unit 35 reflects, in first data, information on a result of work performed on the second image data by a human, and adds a corresponding annotation result. The reflection unit 35 is implemented by a general-purpose processor such as a CPU or a dedicated processor such as various arithmetic circuits that execute a specific association function such as an ASIC.

The training data generation unit 36 generates training data for creating an inference model by using the first image data and the annotation result reflected in the first image data. The training data generation unit 36 generates training data for learning to be transmitted to the learning device 4 in such a way that annotation information is associated with image data in the adding unit 34. The training data is a training image group used when the learning device 4 performs machine learning. Specifically, in a case where the learning device 4 generates an inference model for detecting a tumor, the training data is an image group for which a human such as an expert has determined whether or not a tumor is included. As described above, most of the processing is performed for the purpose of improving the visibility for humans, and thus an element of an image subjected to various types of image processing other than the visibility can be affected. Here, the description will be given assuming that output data from the imaging element before image processing is least affected by the image processing. Here, unprocessed data may be referred to as raw data by translating "unprocessed" into "raw" in English. The raw data may be data cataloged in the form of "raw data recording" in most of the cameras, but in practice, "raw data" in a catalog of a camera is often subjected to minimum image processing. Furthermore, hereinafter, the term "raw image data (or simply referred to as raw data or raw image)" does not necessarily indicate an output of the imaging element as it is, and may be the "raw data recording" in a catalog of a camera. However, "pre-processing data" that is not subjected to any image processing for improving visibility is assumed. However, since there is no simple, precise word, the description will be made using the term "raw image data". The training data generation unit 36 specifies image data (first image data) of a raw image associated with image data (second image data) of an image subjected to image processing by annotation, and generates training data by using the specified raw image. Specifically, when a human observes an image subjected to the image processing recorded in the recording unit 38 and extracts an image including a tumor, the training data generation unit 36 searches for associated raw image data (corresponding to the annotated image) and adopts the same annotation result for the raw image data, thereby generating training data in which a raw image group is a training image group. For example, in general, in a case where a distortion occurs in an image due to characteristics of an imaging optical system, an image obtained by correcting the distortion of raw image data by using characteristic data thereof is used for display or recording in order to secure the visibility or suitability for intuitive sensation of humans. However, in a case where multimodal processing in which the raw image data and the characteristic data are separate data is assumed, learning and inference may be performed with higher reliability than in a case where an image subjected to distortion correction is used. Therefore, here, the raw image data is used as training data at the time of training the AI. The training data generation unit 36 is implemented by a general-purpose processor such as a CPU or a dedicated processor such as various arithmetic circuits that execute specific functions such as an ASIC.

The display control unit 37 controls displaying on the display device 5 by causing the display device 5 to display various screens.

The recording unit 38 records an execution program for the control unit 41 to execute various operations, a control program, and parameters such as a threshold. The recording unit 38 includes a volatile memory, a nonvolatile memory, or a combination thereof. Specifically, the recording unit 38 includes a random access memory (RAM), a read only memory (ROM), and the like.

The estimation unit 39 functions as an inference engine that estimates a tumor included in an image captured by the endoscope 2 by using the inference model generated by the learning device 4. The tumor estimated by the estimation unit 39 is highlighted by the display control unit 37 to support observation by a doctor or the like. The estimation unit 39 is implemented by a general-purpose processor such as a CPU or a dedicated processor such as various arithmetic circuits that execute specific functions such as an ASIC. In order to implement these technologies, conventional general-purpose arithmetic processing circuits such as a CPU and an FPGA may be used. However, since most of the processing of a neural network is multiplication of a matrix, what is called a graphics processing unit (GPU) or a tensor processing unit (TPU) specialized for matrix calculation may be used. In recent years, such a "neural network processing unit (NPU)" of artificial intelligence (AI)-dedicated hardware has been designed to be integrated and embeddable together with other circuits such as a CPU, and may be a part of a processing circuit. The estimation unit 39 may be provided in an inference engine connected to the image processing device 3 via a line such as the Internet.

The recording control unit 40 reflects the annotation result in the first image data related to the same observation target O as that of the second image data and having a different imaging mode and/or display mode from the second image data, and records the first image data and the second image data in association with each other in the recording unit 38. In addition, the recording control unit 40 creates and records an image file of image data of different modes having annotation information for the image data of different modes as metadata. The recording control unit 40 is implemented by a general-purpose processor such as a CPU or a dedicated processor such as various arithmetic circuits that execute specific functions such as an ASIC.

The control unit 41 controls operation processing of the entire observation system 1. The control unit 41 is implemented by a general-purpose processor such as a CPU or a dedicated processor such as various arithmetic circuits that execute specific functions such as an ASIC. Note that the configuration of all or some of the image processor 32, the annotation input unit 33, the adding unit 34, the reflection unit 35, the training data generation unit 36, the display control unit 37, the estimation unit 39, the recording control unit 40, and the control unit 41 may be implemented by a processor such as one CPU.

The learning device 4 performs machine learning by using the training data generated by the training data generation unit 36 to generate an inference model for detecting a tumor or the like from an image. The inference model generated by the learning device 4 is output to the image processing device 3. The learning device 4 is configured using a general-purpose processor such as a CPU or a dedicated processor such as various arithmetic circuits that execute specific functions such as an ASIC, and a recording device such as a RAM and a ROM.

The display device 5 displays various screens under the control of the display control unit 37. The display device 5 may be a monitor including a display such as a liquid crystal display or an organic electro luminescence (EL) display, or may be a head-mounted display wearable by an operator such as a doctor.

In a case where the image processing device 3 performs general processing such as imaging, image processing, and displaying by using the endoscope 2, in order to perform determination by visual recognition by a human as in live view display in a personal camera, the image processor 32 performs pixel correction, distortion correction (in some cases, data subjected to some of these corrections is also referred to as raw image data) as described above, contrast correction, exposure correction (correcting an entire image or partially correcting an image), color correction (white balance, chroma enhancement, or the like), gradation expression (gradual shadow/shade change) correction, and the like based on an imaging result (which may be referred to as raw image data) of the imaging unit 22 to generate display image data, and the display control unit 37 performs display control on image displaying in the display device 5 by using the result. In an extreme example, the display image data may be data reduced to a size close to a limit at which visibility can be ensured, like a thumbnail image. At this time, since what is viewed by a human is an image displayed on the display device 5 (the image is not limited to the live view and may also be an image obtained by performing display control on the display image data once recorded in the recording unit 38), raw image data as an intermediate product has not been recorded so far, but it is important to be able to record such display image data and raw image data in association with each other. Then, the raw image data is used as training data for machine learning. However, since this raw image data is not suitable for sensation of humans when played back as it is, it is not suitable when an expert or the like annotates an image. Note that, although the raw image data is described as image data in which data lost in the course of image processing performed for visibility for humans is left, the raw image data is not necessarily unprocessed data. In addition, the raw image data may be obtained by omitting or thinning out a portion other than the necessity of compression or the like for securing a recording capacity for the purpose other than securing the visibility.

Figure 3A:
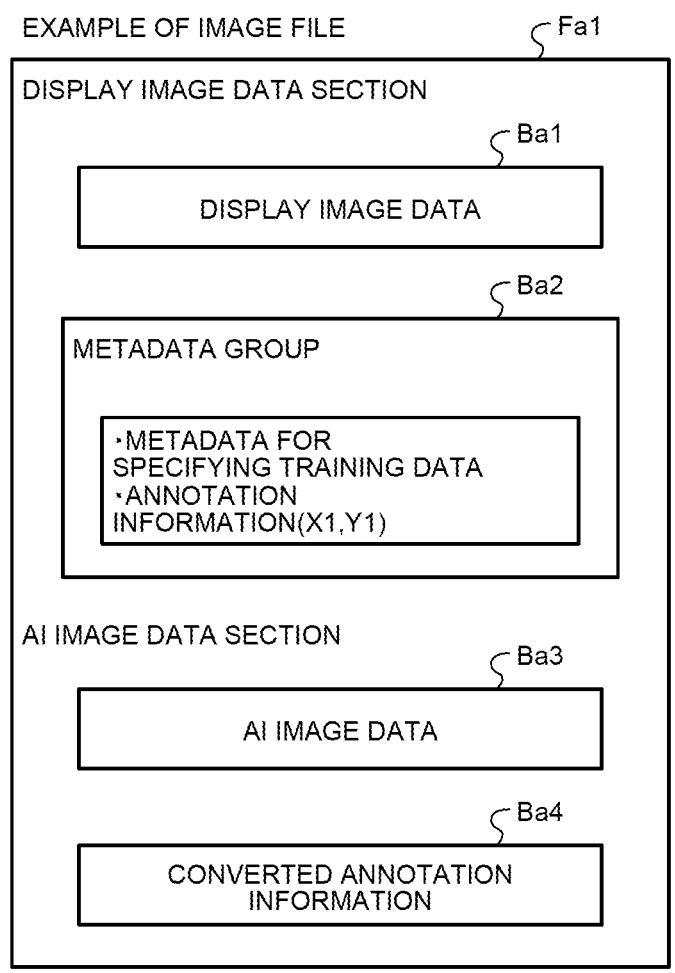
FIG. 3A is a diagram illustrating data constituting an image file serving as training data.
Figure 3B:
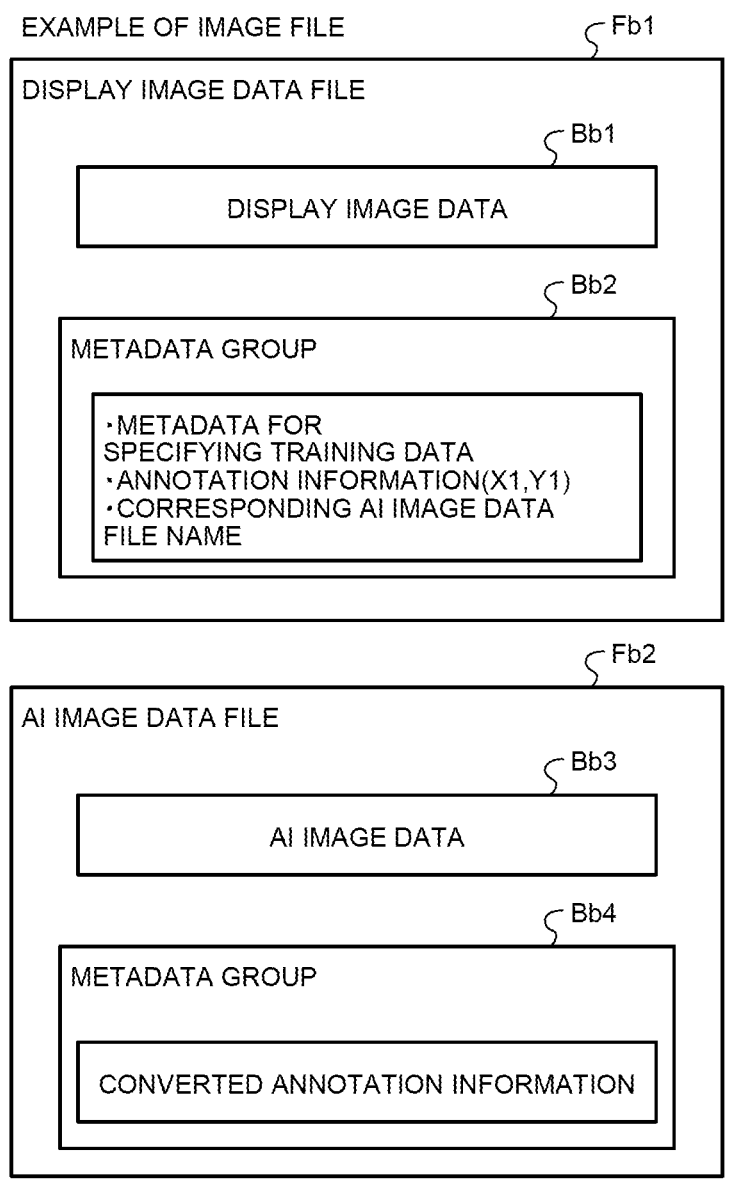
FIG. 3B is a diagram illustrating data constituting an image file serving as the training data.
Figure 3C:
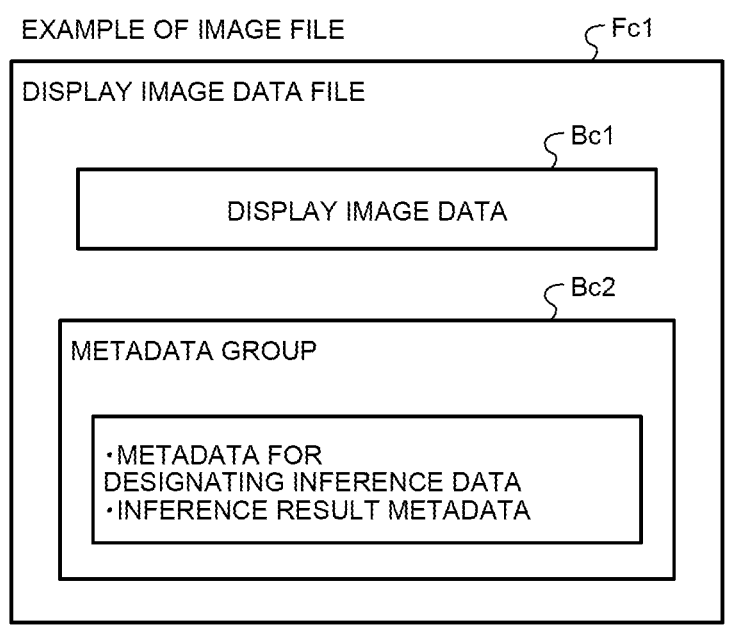
FIG. 3C is a diagram illustrating data constituting an image file serving as the training data.

FIGS. 3A to 3C illustrate an example of a structure of a file at the time of forming an image file when the display image data suitable for visual recognition by a human and the raw image data used by the AI for machine learning are recorded together as described above. The image file is generated when the control unit 41 causes the recording unit 38 to record these pieces of data. The recording control unit 40 or a dedicated circuit (not illustrated) that performs recording control may be separately designed. That is, one image file Fa1 includes a region (block) Ba1 (which may be image data reduced like a thumbnail image depending on a situation) for recording the display image data and a region (block) Ba3 for recording AI image data, and includes a block Ba2 for recording a metadata group for annotating the regions. In the metadata block Ba2, as described above, information indicating that this image is training data and information related to annotation can be recorded. The information related to annotation is assumed to be information indicating what can be confirmed as a target object or what is recorded by an expert while viewing a display image displayed on the display device 5, position information thereof, or the like. In addition, an imaging date and time, an imaging place, an ID of a person who has performed imaging or a patient, and the like may be recorded in the metadata block Ba2. In addition, the display image data is an image obtained by performing, by the image processor 32, image processing such as gamma correction, white balance adjustment, color correction, noise reduction, or image enhancement processing on the raw image data, and further performing compression processing or the like to reduce a recording capacity, and is an image that is captured by the endoscope 2, is recorded, and can be displayed. The display image data is an image that can be easily observed by a human, and is data on which information manipulation has been performed. Therefore, in the first embodiment, the recording region (block) Ba3 separately provided for recording the raw image data close to original data is provided. In addition, since the raw image data is an image before an operation such as distortion correction to convert a coordinate position of the image is performed, in a case where a result of annotation for an in-screen position performed while actually playing back and viewing the display image data is adopted as it is, the correct target object position is not reflected in some cases, and thus annotation information for the converted in-screen position can be recorded in a region (block) Ba4. This is performed in a process as described later in FIG. 4. The block Ba4 may contain data such as parameters used for image correction for multimodal learning/inference. Further, information recorded in the block Ba4 may be included in the metadata group of the block Ba2. In a case of an image to be used as the training data as described above, imaging is performed by setting the use, so that the fact that the image is the training data is recorded as the metadata, and the raw image data is also included (the control unit 41 creates the image file Fa1 and performs recording control in such a way). With such a configuration, it is possible to quickly collect images suitable for training data, perform machine learning, and create an appropriate inference model.

In addition to the recording of the image as illustrated in FIG. 3A, recording of a training data image as illustrated in FIG. 3B may be performed. A raw (AI) image file Fb2 is created and recorded separately from a display image file Fb1 with high visibility. Image data of the image file Fb1 is recorded in a region (block) Bb1 in which image data subjected to image processing for improving visibility and recordability is recorded. Image data recorded in the image file Fb2 is raw image data (obtained by omitting image processing focusing on visibility for unprocessed data) and is recorded in a block Bb3.

A block Bb2 for recording a metadata group may be the same as the metadata group in FIG. 3A, but information designating the AI image file Fb2 including the raw image data to be referred to is described in the block Bb2 to enable search. In addition, there is also a method of setting the same image data file name to associate these two image files with an extension. Here, the AI image file Fb2 for the raw image data includes a block Bb4 for recording an annotation result, but in a case where information of a position such as coordinates in an image is written in the block Bb4, coordinates (corresponding to coordinates before image processing) after performing calculation for converting coordinates described in the block Bb2 into coordinates before image processing are described. Here, the block Bb4 may contain data such as parameters used for image correction for multimodal learning/inference.

Also in a case where another image is newly input to the inference model trained using such an image data file to request for inference, the inference is performed by inputting the image file as illustrated in FIG. 3A or 3B. Also in this case, this metadata can be effectively utilized. For example, once the multi-image recording type image file Fa1 is input, the inference is performed using the information of the blocks Ba3 and Ba4. In a case where data related to image correction for multimodal learning/inference is contained in the metadata region of the block Ba4, it is possible to perform highly accurate inference using this data as well. In addition, any of the metadata described here can be effectively used in multimodal learning and inference. Further, once the image file Fb1 that refers to another image file is input, the image file Fb2 is found from the metadata information recorded in the block Bb2, and learning and inference are similarly performed using the AI image data recorded in the block Bb3. At this time, the metadata of the block Bb4 may be used as appropriate. Further, this may be described in the metadata. That is, these image files may include metadata for designating multimodal AI. Although "metadata for indicating training data" is described in the blocks Ba2 and Bb2, this metadata may be described as "metadata for inference input" in a case where the metadata is used for input of the inference model, thereby indicating what image is used for what purpose. In addition, information designating an inference model to which the image is to be input may be described and recorded in the metadata. As described above, it is possible to provide the image processing device 3 serving as the recording device including: the image processor 32 that performs image processing in order to display image data that is a result of imaging an observation target on the display unit (display device 5); the adding unit 34 that acquires information on annotation performed on a display image of the image data displayed on the display unit and adds the annotation information to the image data having a mode different from that displayed on the display unit; and the recording control unit 40 that creates and records an image file of the image data having the different mode, the image file including, as metadata, the annotation information for the image data having the different mode.

In addition, FIG. 3C illustrates an example of an image file of an inference result. An image file Fc1 includes a block Bc1 for recording the display image data and a block Bc2 for recording information regarding inference. Here, it is assumed that the image file Fc1 is used to show the inference result to people, and the raw image data and association information thereof are thus unnecessary. However, information such as a content of the inference result and an inference model that has performed the determination can be recorded as metadata. As a result, it is possible to avoid black-boxing of AI and to partially fulfill the responsibility of explanation of AI. Note that, although a method of recording the annotation information as metadata in the image file Fc1 has been described here, the annotation information may be recorded as data in another related file or folder. As described above, it is possible to provide the image processing device 3 serving as the training data generation device including: the annotation input unit 33 that performs annotation on the display image data (second image data) obtained by performing image processing or the like on the image data (first image data) obtained by imaging the observation target O; the adding unit 34 that reflects and adds an annotation result in and to the first image data (herein, described as the raw image data) that is related to the same observation target O as that of the second image data and has a different imaging mode from the second image data; and the training data generation unit 36 that generates the training data for creating the inference model by using the first image data and the annotation result reflected in the first image data. Here, a second image is an image in which pixel information is correctly arranged two-dimensionally and the hue, contrast, gradation expression, and the like are adjusted as appropriate for visual recognition, but a first image is a pixel data group before any of the visibility improvement processing is performed.

Processing Performed by Image Processing Device when Generating Training Data

Figure 4:
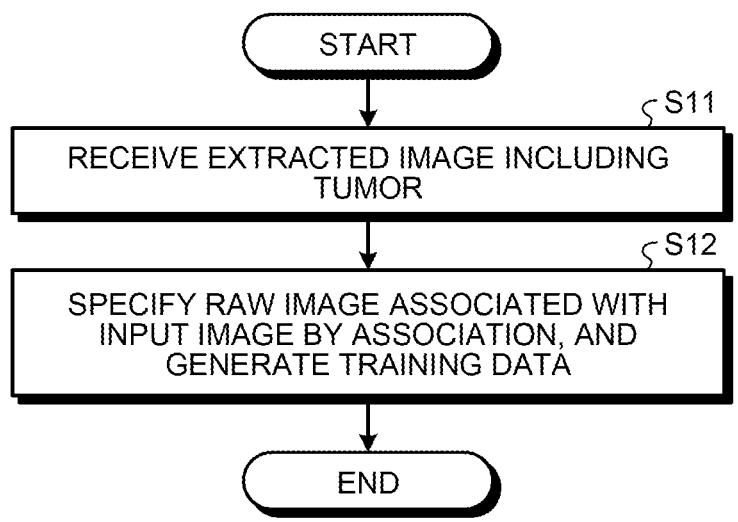
FIG. 4 is a flowchart illustrating an outline of processing performed by an image processing device when generating the training data.

FIG. 4 is a flowchart illustrating an outline of processing performed by the image processing device when generating the training data. First, a human observes an image subjected to image processing recorded in the recording unit 38, and extracts an image including a tumor. Then, as illustrated in FIG. 4, the image processing device 3 receives an input of the extracted image including the tumor (Step S11). The received image is the annotation information. Note that the annotation can be performed not only on an image recorded in the recording unit 38 but also on a live view image, and in a case of performing the annotation on the live view image, the annotation is performed on the imaging result, and the annotated imaging result is recorded as the training data. Note that the annotation information may be a determination result obtained by a human determining whether or not a tumor is included in an image, or may include position information of the extracted tumor.

Then, the training data generation unit 36 specifies a raw image associated with the input image by association, and generates training data by using the specified image (Step S12). Specifically, the training data generation unit 36 specifies a raw image associated with the input image, identifies that the specified image group is an image including a tumor, and generates training data in which raw image data for which the determination of whether or not a tumor is included has been made is training image data. In addition, in a case where the annotation information includes the position information of the tumor, the training data generation unit 36 specifies a raw image associated with the input image, and generates training data in which the specified image group and an annotation result including the position information of the tumor reflected by the reflection unit 35 in the image group are used as training image data. At this time, since coordinate conversion and the like are performed depending on the type of image processing, the image processing device 3 performs coordinate conversion to create different coordinate data and describes the coordinate data as (for example) metadata of the raw image data for learning. This data may be recorded in another referenceable file.

According to the first embodiment described above, it is possible to generate training data using a raw image suitable for machine learning without performing image processing mainly for securing the visibility or recordability (data compression). An annotation result based on an image with excellent visibility is reflected here, and thus, learning for generating an inference model with extremely high reliability and high accuracy can be performed. In addition, inference using raw image data as an input may be performed in a similar manner. In this case, the image data for inference input has high visibility due to the related display image data, and a large amount of information of the raw image can be used for inference, thereby enabling inference with high accuracy.

Second Embodiment

Configuration of Observation System

Figure 5:
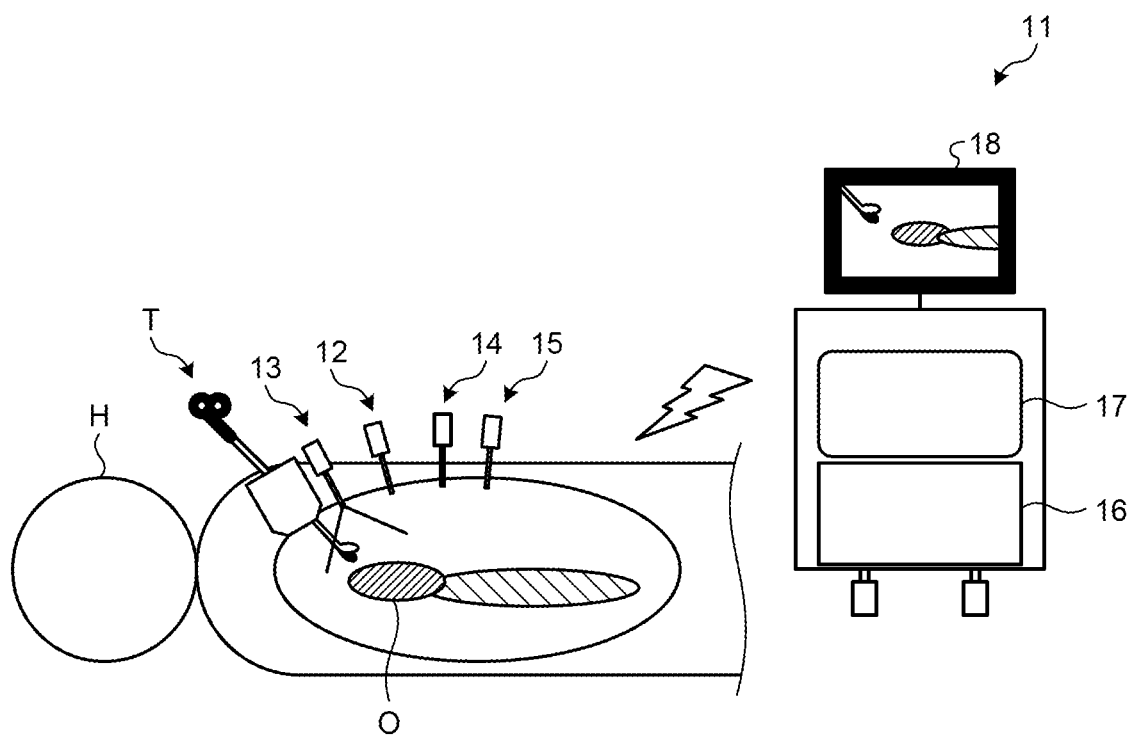
FIG. 5 is a schematic diagram illustrating a configuration of an observation system according to a second embodiment.

First, a configuration of an observation system will be described. FIG. 5 is a schematic diagram illustrating a configuration of an observation system according to a second embodiment. As illustrated in FIG. 5, an observation system 11 according to the second embodiment observes an observation target O in a subject H. Endoscopic surgery can be performed by observing the observation target O in the subject H with the observation system 11 and performing treatment on the subject H with a treatment tool T.

Figure 6:
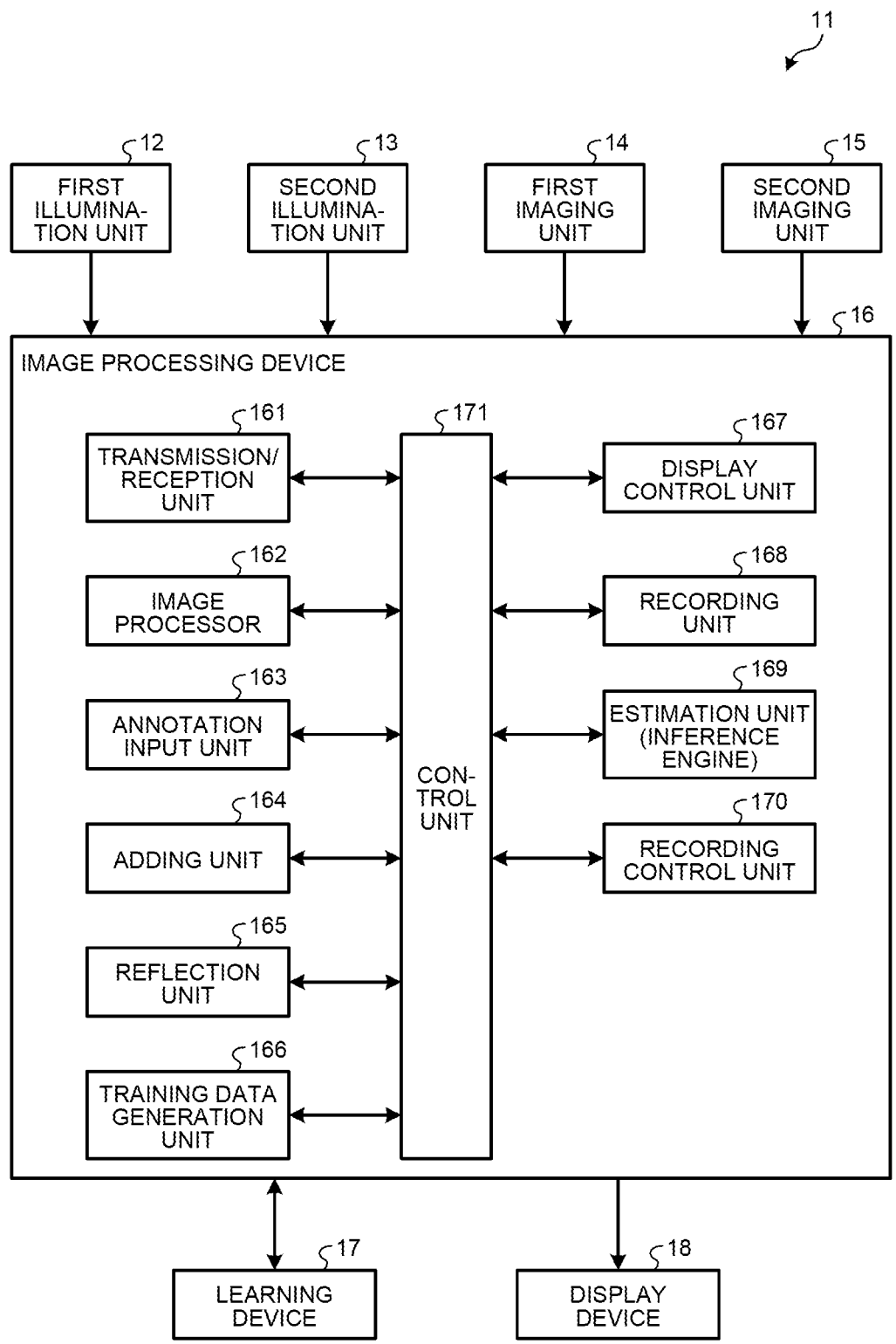
FIG. 6 is a block diagram illustrating a configuration of the observation system according to the second embodiment.

FIG. 6 is a block diagram illustrating a configuration of the observation system according to the second embodiment. As illustrated in FIG. 6, the observation system 11 includes a first illumination unit 12, a second illumination unit 13, a first imaging unit 14, a second imaging unit 15, an image processing device 16, a learning device 17, and a display device 18.

The first illumination unit 12 irradiates the observation target O with normal light. The normal light is illumination light used for normal observation that is not special light observation. The first illumination unit 12 is attached to the subject H by being inserted into an insertion portion which is a hard needle having no flexibility and having a diameter of, for example, 2 mm or more and 3 mm or less. The first illumination unit 12 includes a light source including a light emitting diode (LED) or the like and a battery that supplies power to the light source. The observation target O is irradiated with the illumination light emitted from the light source via a lens or an optical fiber arranged inside the needle. However, an endoscope 2 may irradiate the observation target O with illumination light output from an external light source device.

The second illumination unit 13 irradiates the observation target O with special observation light. The second illumination unit 13 is attached to the subject H by being inserted into an insertion portion which is a hard needle having no flexibility and having a diameter of, for example, 2 mm or more and 3 mm or less. The second illumination unit 13 includes a light source including an LED or the like and a battery that supplies power to the light source. The observation target O is irradiated with the special observation light emitted from the light source via a lens or an optical fiber arranged inside the needle. However, the second illumination unit 13 may irradiate the observation target O with special observation light output from an external light source device. The special observation light is, for example, special observation light used for narrow band imaging (NBI) observation, infrared imaging (IRI) observation, or fluorescence observation, and is light having a spectrum different from a spectrum of normal illumination light.

The first imaging unit 14 images the observation target O. The first imaging unit 14 is attached to the subject H by being inserted into an insertion portion which is a hard needle having no flexibility and having a diameter of, for example, 2 mm or more and 3 mm or less. The first imaging unit 14 includes an imaging element implemented using a CCD image sensor or CMOS image sensor, an A/D conversion circuit, or the like. Then, light reflected from the observation target O is imaged by the imaging element via a lens or an optical fiber arranged inside the needle.

The second imaging unit 15 images the observation target O from a position different from that of the first imaging unit 14. The second imaging unit 15 is attached to the subject H by being inserted into an insertion portion which is a hard needle having no flexibility and having a diameter of, for example, 2 mm or more and 3 mm or less. As the insertion portions puncture different positions of the subject H, the observation target O is imaged from the different positions of the first imaging unit 14 and the second imaging unit 15. The second imaging unit 15 includes an imaging element implemented using a CCD image sensor or CMOS image sensor, an A/D conversion circuit, or the like. Then, light reflected from the observation target O is imaged by the imaging element via a lens or an optical fiber arranged inside the needle. The imaging element of the second imaging unit 15 is an imaging element having sensitivity to a spectrum of the special observation light emitted by the second illumination unit 13 and suitable for special light observation using the special observation light.

The image processing device 16 includes a transmission/reception unit 161, an image processor 162, an annotation input unit 163, an adding unit 164, a reflection unit 165, a training data generation unit 166, a display control unit 167, a recording unit 168, an estimation unit 169, a recording control unit 170, and a control unit 171. Since the transmission/reception unit 161, the image processor 162, the annotation input unit 163, the display control unit 167, the recording unit 168, the recording control unit 170, and the control unit 171 may have configurations similar to those of the transmission/reception unit 31, the image processor 32, the annotation input unit 33, the display control unit 37, the recording unit 38, the recording control unit 40, and the control unit 41, respectively, a description thereof will be omitted.

The adding unit 164 adds various annotation results to image data. Specifically, the adding unit 164 is a functional block including a circuit, a program, or the like having a function of associating, with an image, information on a content and a position of a target object for which an expert or the like performs annotation while viewing a normal light (white light) image with high visibility. The adding unit 164 adds an annotation result, which is information on a content and a position of a target object, to image data (second image data) of an image obtained by the first imaging unit 14 imaging the observation target O with normal light. The adding unit 164 is implemented by a general-purpose processor such as a CPU or a dedicated processor such as various arithmetic circuits that execute specific functions such as an ASIC.

The reflection unit 165 reflects and adds the annotation result added to the second image data to image data (first image data) of an image obtained by performing image processing to an image obtained by the second imaging unit 15 imaging the observation target O with special observation light. That is, as the annotation result is added to the second image data, the annotation result is automatically added to the first image data correspondingly. The reflection unit 165 is implemented by a general-purpose processor such as a CPU or a dedicated processor such as various arithmetic circuits that execute specific functions such as an ASIC.

The image data to which the annotation result has been added by the adding unit 164 or the reflection unit 165 is recorded in the recording unit 168. In other words, the image data of the image of the normal observation and the image data of the special light observation are recorded in the recording unit 168 in association with each other. The second embodiment is an example in which an image with improved visibility (the display image and the second image) is a normal observation image and the raw image (first image) corresponds to a special light observation image according to the first embodiment described using a relationship between a processed image with improved visibility and an image before processing (raw image), and application in which the special light observation image is recorded as a raw image that is not subjected to image processing for improving visibility may be made.

The training data generation unit 166 generates training data for learning to be transmitted to the learning device 17. The training data generation unit 166 specifies the image data (second image data) of the image of the normal observation associated with the image data (first image data) of the image obtained by performing the image processing on the special light observation image, performs annotation by using the specified image, and generates the training data to which the result information is added. Specifically, the training data generation unit 166 reflects the annotation result in the corresponding special observation light image recorded in the recording unit 168. The training data generation unit 166 is implemented by a general-purpose processor such as a CPU or a dedicated processor such as various arithmetic circuits that execute specific functions such as an ASIC.

Since the learning device 17 and the display device 18 may have configurations similar to those of the learning device 4 and the display device 5, respectively, a description thereof will be omitted.

The transmission/reception unit 161 receives image data of an image obtained by imaging the observation target O with normal illumination light and special observation light from the first imaging unit 14 and the second imaging unit 15, respectively. Note that the first imaging unit 14 performs imaging in a state where the observation target O is irradiated with normal illumination light by the first illumination unit 12 (normal observation), and the second imaging unit 15 performs imaging in a state where the observation target O is irradiated with special observation light by the second illumination unit 13 (special light observation). The normal observation and the special light observation may be alternately performed for each frame, or may be separately performed. However, it is preferable that the first imaging unit 14 and the second imaging unit 15 image substantially the same position of the observation target O. Although the special light observation may be performed only when imaging is performed by manual operation or the like, here, an example in which imaging for both of the normal observation and the special light observation is always performed will be described. The pieces of image data of the images of the normal observation and the special light observation received by the transmission/reception unit 161 are associated with each other and recorded in the recording unit 168.

The image processor 162 performs image processing such as gamma correction, white balance adjustment, color correction, noise reduction, or image enhancement processing on the images of the normal observation and the special light observation.

Processing Performed by Image Processing Device when Generating Training Data

Figure 7:
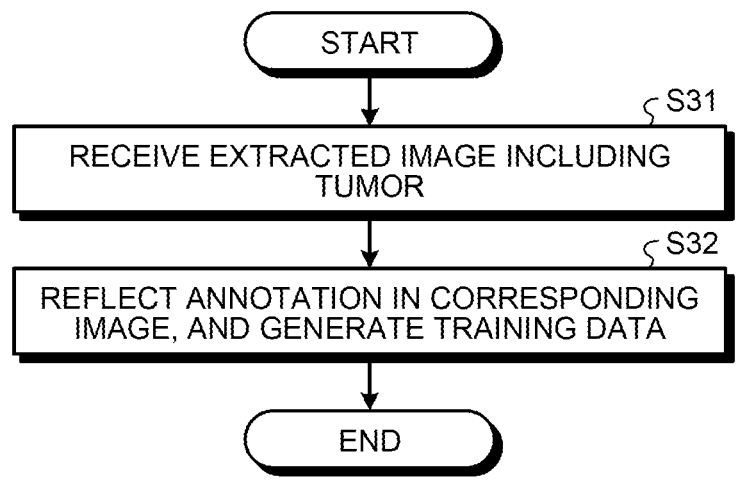
FIG. 7 is a flowchart illustrating an outline of processing performed by the image processing device when generating training data.

FIG. 7 is a flowchart illustrating an outline of processing performed when generating the training data. First, a human observes a normal observation image recorded in the recording unit 168, and extracts an image including a tumor. Then, as illustrated in FIG. 7, the image processing device 16 receives an input of the extracted image including the tumor (Step S31). The image is an image of normal light observation that can be easily seen and understood by a doctor or an expert, and the expert can determine what is shown here (object) and the position thereof by viewing this image.

Once information on the object and the position thereof is input (annotation) for the image with high visibility, the adding unit 34 reflects the annotation result in data of a corresponding special light image, and the training data generation unit 166 generates the training data (Step S32). Note that, at this time, wavelength information or the like at the time of imaging may be recorded as the metadata described in FIGS. 3A to 3C in order to support a multi-modal method. Furthermore, information such as wavelength distributions of two images and a difference thereof may be recorded. As described above, it is possible to provide the image processing device 16 serving as the training data generation device having the functions of the annotation input unit 163, the reflection unit 165, and the training data generation unit 166, in which the image (second image data) obtained by imaging the observation target O with normal light is an image that is natural when viewed by a human, and thus, in a case where the annotation input unit 163 that performs annotation on the image is prepared, it is sufficient if the reflection unit 165 reflects the annotation result in the image data (first image data) that is obtained using the special light, and is related to the same observation target O as that of the second image data, and has a different imaging mode, and the training data generation unit 166 generates the training data for creating the inference model by using the first image data and the annotation result reflected in and added to the first image data. Here, the second image is an image with high visibility, and imaging with illumination light such as natural light, white light, or daylight is assumed. Furthermore, as the image processing and the like, processing for natural contrast, exposure, and hue to humans is performed. In addition, since such image data is recorded as data (file) that is easy to handle with the configuration as illustrated in FIGS. 3A to 3C, the present application also discloses the recording device and the recording method.

Third Embodiment

Configuration of Observation System

Figure 8:
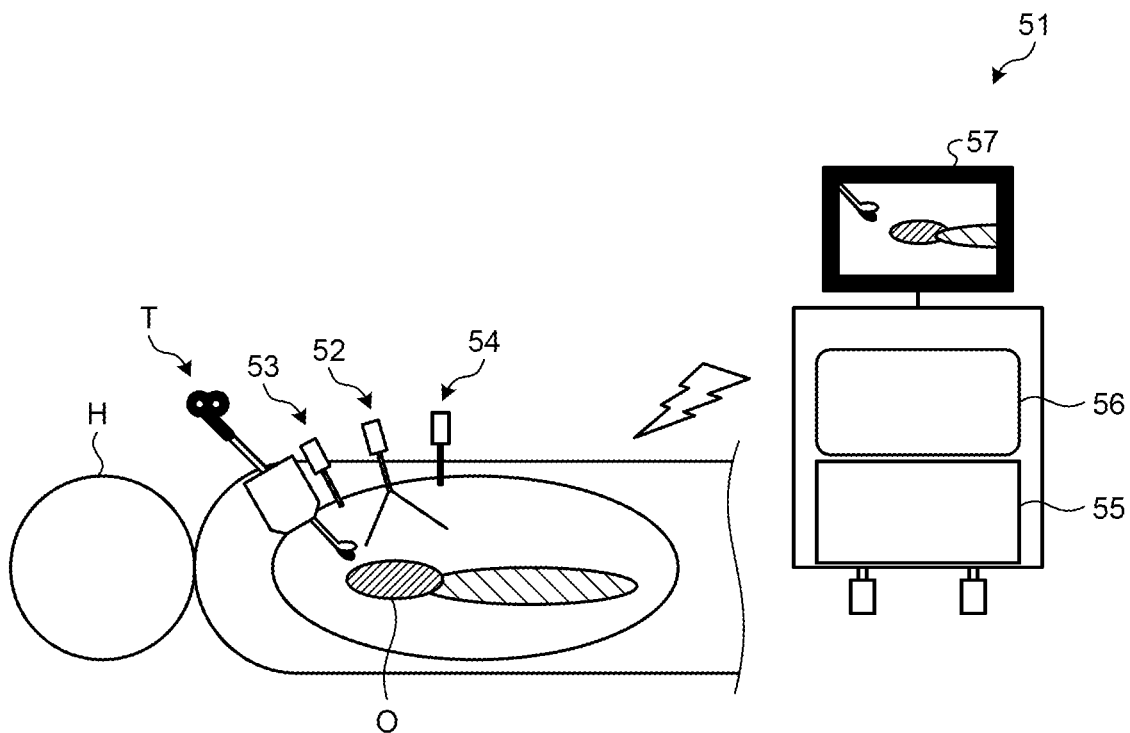
FIG. 8 is a schematic diagram illustrating a configuration of an observation system according to a third embodiment.

First, a configuration of an observation system will be described. FIG. 8 is a schematic diagram illustrating a configuration of an observation system according to a third embodiment. As illustrated in FIG. 8, an observation system 51 according to the third embodiment observes an observation target O in a subject H. Endoscopic surgery can be performed by observing the observation target O in the subject H with the observation system 51 and performing treatment on the subject H with a treatment tool T.

Figure 9:
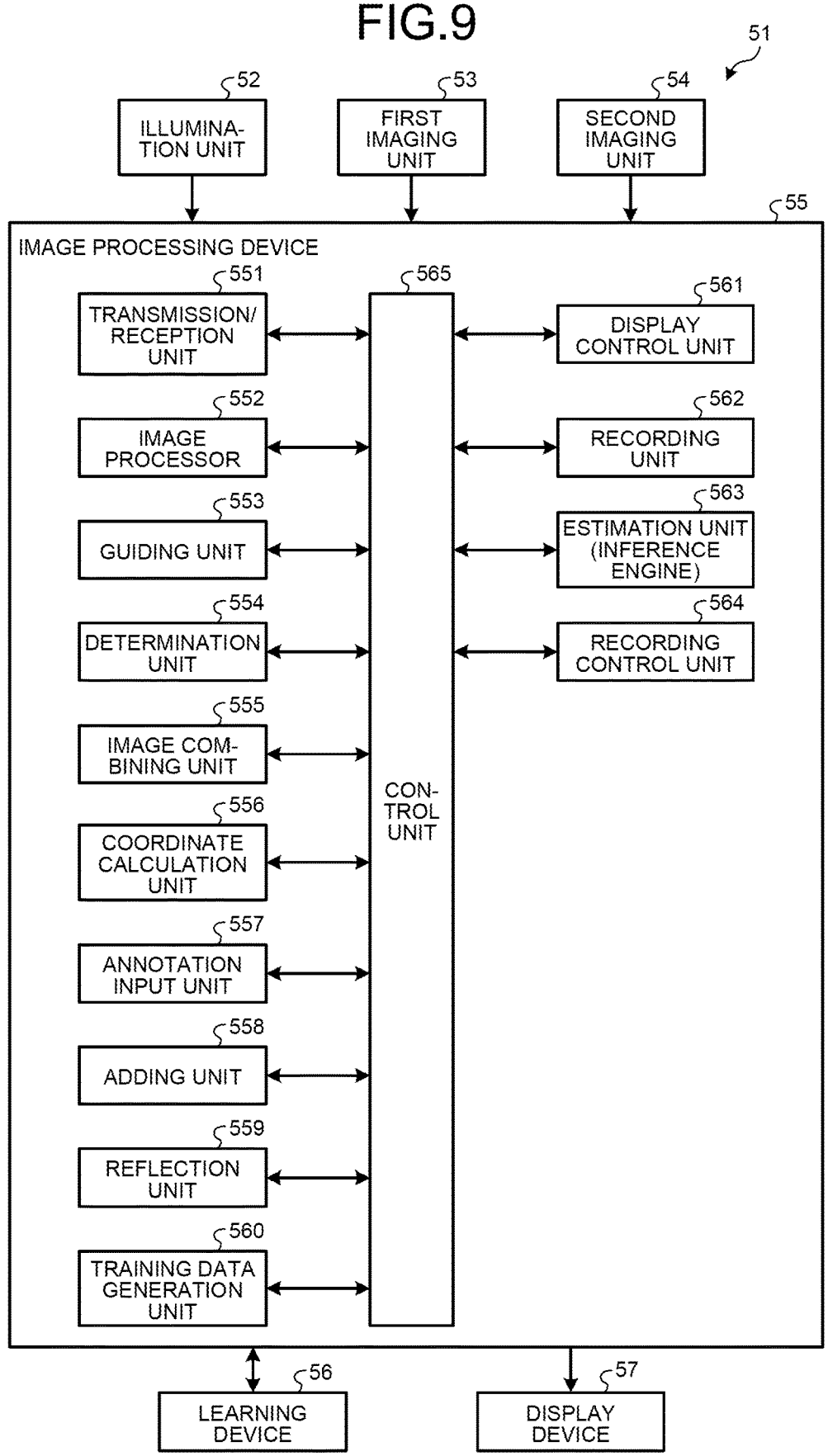
FIG. 9 is a block diagram illustrating a configuration of the observation system according to the third embodiment.

FIG. 9 is a block diagram illustrating a configuration of the observation system according to the third embodiment. As illustrated in FIG. 9, the observation system 51 includes an illumination unit 52, a first imaging unit 53, a second imaging unit 54, an image processing device 55, a learning device 56, and a display device 57.

The illumination unit 52 irradiates the observation target O with illumination light. The illumination unit 52 is attached to the subject H by being inserted into an insertion portion which is a hard needle having no flexibility and having a diameter of, for example, 2 mm or more and 3 mm or less. The illumination unit 52 includes a light source including an LED or the like and a battery that supplies power to the light source. The observation target O is irradiated with the illumination light emitted from the light source via a lens or an optical fiber arranged inside the needle. However, the illumination unit 52 may irradiate the observation target O with illumination light output from an external light source device.

The first imaging unit 53 and the second imaging unit 54 image the observation target O from different positions. Hereinafter, an example in which two imaging units are provided will be described, but it is sufficient if the number of imaging units is plural, and three or more imaging units may be provided. The first imaging unit 53 and the second imaging unit 54 are attached to the subject H by being inserted into insertion portions which are hard needles having no flexibility and having a diameter of, for example, 2 mm or more and 3 mm or less. As the insertion portions puncture different positions of the subject H, the first imaging unit 53 and the second imaging unit 54 image the observation target O from different positions. The first imaging unit 53 and the second imaging unit 54 each include an imaging element implemented using a CCD image sensor or CMOS image sensor, an A/D conversion circuit, or the like. Then, light reflected from the observation target O is imaged by the imaging element via a lens or an optical fiber arranged inside the needle.

The image processing device 55 includes a transmission/reception unit 551, an image processor 552, a guiding unit 553, a determination unit 554, an image combining unit 555, a coordinate calculation unit 556, an annotation input unit 557, an adding unit 558, a reflection unit 559, a training data generation unit 560, a display control unit 561, a recording unit 562, an estimation unit 563, a recording control unit 564, and a control unit 565. Since the transmission/reception unit 551, the image processor 552, the annotation input unit 557, the display control unit 561, the recording unit 562, the estimation unit 563, and the control unit 565 may have configurations similar to those of the transmission/reception unit 31, the image processor 32, the annotation input unit 33, the display control unit 37, the recording unit 38, and the control unit 41, respectively, a description thereof will be omitted.

The guiding unit 553 guides the positions of the first imaging unit 53 and the second imaging unit 54. The guiding unit 553 guides the positions at which the first imaging unit 53 and the second imaging unit 54 puncture or a positional relationship between the first and second imaging units 53 and 54 and the observation target O by, for example, outputting a sound, outputting a text on the display device 5, or irradiating the subject H or the like with light. The guiding unit 553 may guide the positions of the first imaging unit 53 and the second imaging unit 54 to in-focus positions, or may perform guiding in such a way that the observation target O is included at a predetermined ratio or more. The guiding unit 553 is implemented by a general-purpose processor such as a CPU or a dedicated processor such as various arithmetic circuits that execute specific functions such as an ASIC.

The determination unit 554 determines whether or not there is an overlapping portion between an imaging region of an image captured by the first imaging unit 53 that images the observation target O in the subject H and an image captured by the second imaging unit 54 that images the observation target O from a position different from the position of the first imaging unit 53. In addition, the determination unit 554 determines whether or not the first imaging unit 53 and the second imaging unit 54 are inserted to focal positions where the observation target O is in focus. Here, the focal positions are used to describe the positions where the first imaging unit 53 and the second imaging unit 54 are arranged at a distance at which the observation target O is in focus. A state of an image of the observation target O is determined in a process of insertion, and when the first imaging unit 53 and the second imaging unit 54 are at the positions where the imaging optical system is not focused, the contrast is lowered because a blurred image is captured, and in a state where the imaging optical system is focused (focal position), the contrast is high. Therefore, it is possible to perform detection based on a change in contrast or comparison with a predetermined value. The image processor 552 may perform the determination by obtaining contrast values of the obtained images. The determination unit 554 is implemented by a general-purpose processor such as a CPU or a dedicated processor such as various arithmetic circuits that execute specific functions such as an ASIC.

In a case where the determination unit 554 determines that the first imaging unit 53 and the second imaging unit 54 are respectively inserted up to the focal positions where the observation target O is in focus and determines that there is an overlapping portion between the imaging region of the image captured by the first imaging unit 53 and the imaging region of the image captured by the second imaging unit 54, the image combining unit 555 generates a composite image obtained by combining these images. The image combining unit 555 is implemented by a general-purpose processor such as a CPU or a dedicated processor such as various arithmetic circuits that execute specific functions such as an ASIC.

The coordinate calculation unit 556 detects a feature point of a captured image (a characteristic point of the image such as an edge portion of a lesion or a bleeding point), calculates a movement amount between images based on a position of the feature point, and adds, for example, two-dimensional coordinates to each image. The coordinate calculation unit 556 may calculate coordinates of the center of each image or may calculate coordinates of four corners of each image. Furthermore, the coordinate calculation unit 556 calculates coordinates of a tumor or the like found by human observation of the composite image.

The adding unit 558 adds various annotation results to image data. In addition, the adding unit 558 associates image data (second image data) of an image obtained by combining images obtained by imaging the observation target O by the first imaging unit 53 and the second imaging unit 54 (first image data) with the images, and adds an annotation result to the second image data. The adding unit 558 is implemented by a general-purpose processor such as a CPU or a dedicated processor such as various arithmetic circuits that execute specific functions such as an ASIC.

The reflection unit 559 reflects the annotation result for the image data (second image data) of the image obtained by combining the images in the image data (first image data) before the combination to add the annotation result. In this way, annotation performed on the composite image that is easy for a human to perform determination is reflected in the image before the combination. An image before the combination is used for AI, and it is sufficient if a human who creates or uses AI handles an easily understandable composite image. The reflection unit 559 is implemented by a general-purpose processor such as a CPU or a dedicated processor such as various arithmetic circuits that execute specific functions such as an ASIC.

The image data to which the annotation result is added by the adding unit 558 or the reflection unit 559 is recorded in the recording unit 562. An annotation for a first image is for AI, and an annotation for a second image is for confirmation by a human. In a case where the confirmation is unnecessary, the annotation for the second image does not have to be recorded. It is a matter of course that the first image data may be raw image data, or the first image data may be captured with special light and recorded according to the idea of the first and second embodiments. In the recording unit 562, a plurality of pieces of image data of images and image data of an image obtained by performing image processing on the images and combining the images are recorded in association with each other.

The training data generation unit 560 generates training data to be transmitted to the learning device 56. The training data generation unit 560 specifies a plurality of raw images (first image data) associated with a composite image (second image data), and generates training data using the specified images. Specifically, once a human observes the composite image recorded in the recording unit 562 and extracts an image including a tumor, the training data generation unit 560 identifies a plurality of images associated with the extracted image as images including a tumor, and generates training data in which an image group for which determination of whether or not a tumor is included has been performed is a training image group. The training data generation unit 560 is implemented by a general-purpose processor such as a CPU or a dedicated processor such as various arithmetic circuits that execute specific functions such as an ASIC. The third embodiment is an example in which an image with improved visibility (the display image and the second image) is a composite observation image, and the raw image (first image) of the first embodiment corresponds to an image before combination according to the first embodiment described using a relationship between a processed image with improved visibility and an image before processing (raw image), and as described above, application in which the image before combination is recorded as the raw image may be made. In addition, an observation image obtained with special light may be used according to the idea of the second embodiment.

Since the learning device 56 and the display device 57 may have configurations similar to those of the learning device 4 and the display device 5, respectively, a description thereof will be omitted.

Figure 10:
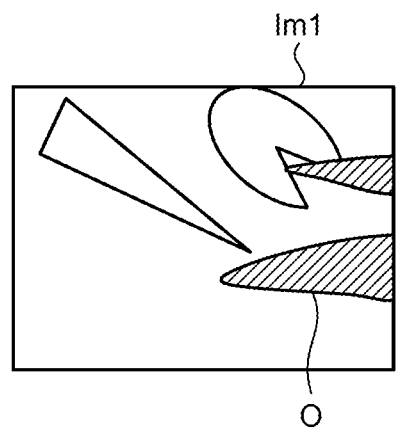
FIG. 10 illustrates an example of an image captured by a first imaging unit.

Here, an example in which a plurality of images are acquired by an endoscope 2 according to the third embodiment, are combined, and are displayed will be described. FIG. 10 illustrates an example of an image captured by the first imaging unit. As illustrated in FIG. 10, an image Im1 captured by the first imaging unit 53 includes the observation target O, but does not include a tumor.

Figure 11:
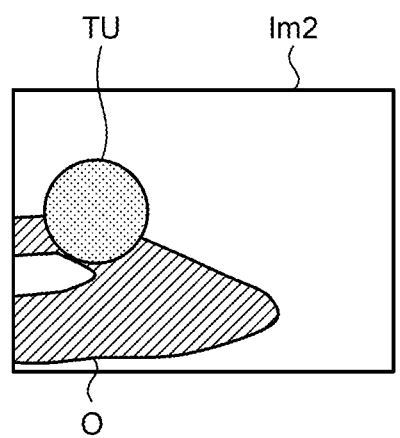
FIG. 11 illustrates an example of an image captured by a second imaging unit.

FIG. 11 illustrates an example of an image captured by the second imaging unit. As illustrated in FIG. 11, an image Im2 captured by the second imaging unit 54 includes the observation target O and a tumor TU. A composite image (second image) can be created by combining these images in such a way as to overlap common parts of the images like a margin. The composite image is an image with which a human can easily recognize a relationship between the whole and the part and which enables easy intuitive grasping, understanding, recognition, and determination, or in which information for finding a specific target is rich. The composite image may be referred to as a display image to be displayed on the display device 57. However, a machine such as a computer does not necessarily consider that the composite image is rich in information as human due to overlapping of margin portions. Rather, it may be easier for a computer to determine the information in multimodal processing in which margin information is separately acquired and individual images are determined as individual images.

Therefore, the coordinate calculation unit 556 calculates coordinates of each of the images Im1 and Im2 based on the composite image from the combination result. The coordinate relationship and the like of the individual images serve as secondary information of the multimodal processing. These may be recorded as metadata as illustrated in FIGS. 3A to 3C.

When an expert such as a doctor adds annotation information while recognizing the whole with the composite image, the adding unit 558 adds the annotation result including coordinate information of each image to the two images in such a way as to be replaced and diverted, and records the two images to which the annotation result is added in the recording unit 562. As described above, it is possible to provide the image processing device 55 serving as the training data generation device including: the annotation input unit 557 that performs annotation on the composite image (second image data) obtained by imaging the observation target O; the reflection unit 559 that reflects an annotation result in the first image data that is related to the same observation target O as the second image data and has a different imaging display mode (here, a plurality of images before combination and an image obtained by combining the images are displayed in different modes); and the training data generation unit 560 that generates training data for creating an inference model by using the first image data and the annotation result reflected in the first image data. Here, the second image is assumed to be a composite image that is easily displayed and confirmed. That is, as indicated by the term "visibility", the composite image is an image which has a wide visual field for an imaged target object and a wide imaging target range and with which the entire image and the partial image can be easily confirmed. In addition, since such image data is recorded as data (file) that is easy to handle with the configuration as illustrated in FIGS. 3A to 3C, the present application also discloses the recording device and the recording method.

Figure 12:
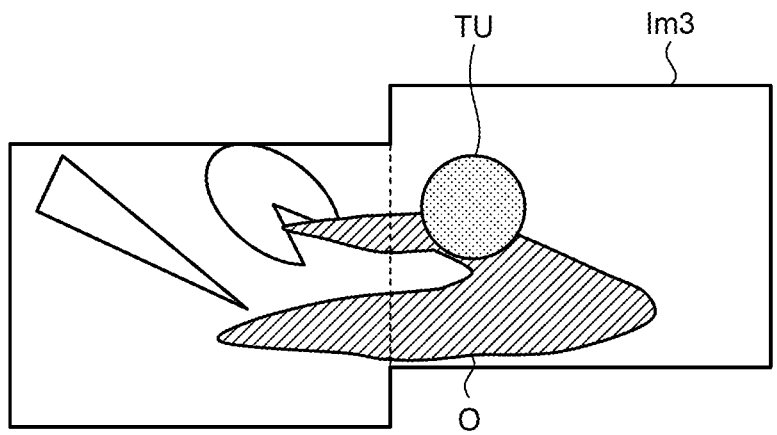
FIG. 12 illustrates an example of a composite image.

FIG. 12 illustrates an example of the composite image. As illustrated in FIG. 12, the image combining unit 555 combines the image Im1 captured by the first imaging unit 53 and the image Im2 captured by the second imaging unit 54 to generate a composite image Im3. As the composite image Im3 is generated, an image which enables easy observation by a human because the entire observation target O can be observed with the images captured by the first imaging unit 53 and the second imaging unit 54 is obtained.

When the adding unit 558 adds an annotation result including coordinate information to the composite image Im3 composited and records the composite image Im3 to which the annotation result is added in the recording unit 562, the image data of the plurality of images and the image data of the composite image obtained by combining the plurality of images are associated with each other and recorded in the recording unit 562.

Processing Performed by Image Processing Device when Generating Training Data

Figure 13:
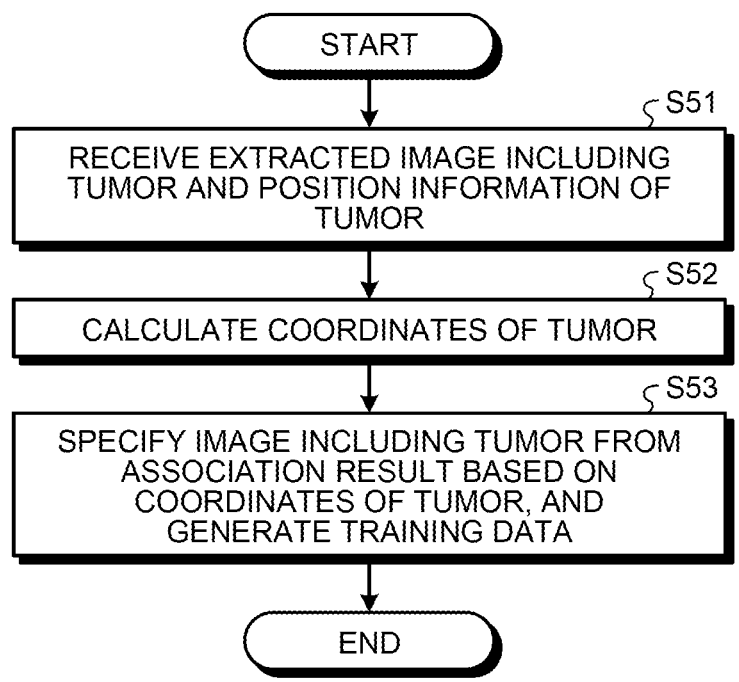
FIG. 13 is a flowchart illustrating an outline of processing performed by an image processing device when generating training data.

FIG. 13 is a flowchart illustrating an outline of processing performed by the image processing device when generating the training data. This is an example in which a doctor or an expert matches an image after combination that has an expanded confirmation range and enables easy understanding with an image before combination. The composite image is richer in information such as continuity of individual images for a human, and an expert can determine what is shown here (object) and the position thereof by viewing the composite image. First, a human observes the composite image Im3 recorded in the recording unit 562, and extracts an image including the tumor TU. Then, as illustrated in FIG. 13, the image processing device 55 receives an input of the extracted composite image Im3 including the tumor TU and position information of the tumor TU included in the composite image Im3 (Step S51).

Then, the coordinate calculation unit 556 calculates the coordinates of the tumor TU based on the input position information (Step S52).

The training data generation unit 560 specifies the image including the tumor TU (image Im2) from an association result (formation of a file in a multi-image format or reference to an image file name, a specific file name relationship, or an extension in a case of separate files) based on the coordinates of the tumor TU included in the input composite image, and generates training data based on the specified image Im2 (Step S53). Specifically, the training data generation unit 560 specifies, based on the coordinates of the tumor TU included in the input composite image, the image (image Im2) including the tumor TU by an annotation association result, identifies the specified image group as an image including a tumor, and generates training data in which an image group for which the determination of whether or not a tumor is included has been made is a training image group. Note that, at this time, a combined place and the like may be recorded as the metadata described in FIGS. 3A to 3C to support a multimodal method. Alternatively, coordinate information converted from coordinates added as an annotation result may be recorded for each image. In addition, since such image data is recorded as data (file) that is easy to handle with the configuration as illustrated in FIGS. 3A to 3C, the present application also discloses the recording device and the recording method.

According to the third embodiment described above, it is possible to perform machine learning by using individual images before combination suitable for machine learning without performing image processing and combining images.

First Modified Example

Next, an observation system according to a first modified example will be described. Since a configuration of the observation system according to the first modified example may be similar to the configuration of the first embodiment illustrated in FIG. 2, a description thereof will be omitted.

Figure 14:
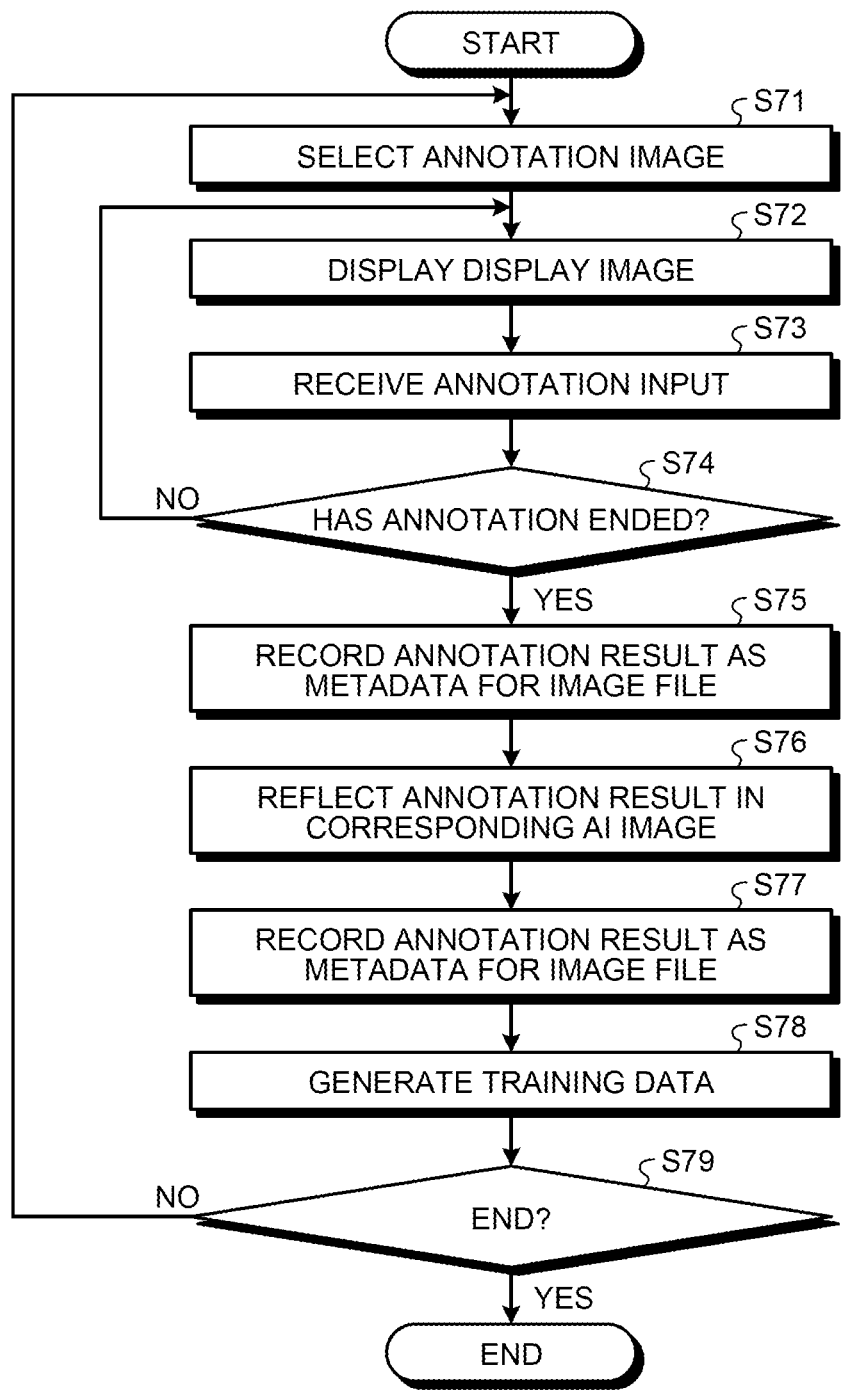
FIG. 14 is a flowchart illustrating an outline of processing performed by an observation system according to a first modified example when generating training data.

FIG. 14 is a flowchart illustrating an outline of processing performed by the observation system according to the first modified example when generating training data. As illustrated in FIG. 14, first, a user who confirms an image such as an expert selects an image to be annotated among images recorded in the recording unit 38 (Step S71).

Then, the display control unit 37 causes the display device 5 to display a display image (an image subjected to image processing (second image)) of the selected image (Step S72).

Then, the user confirms the display image and inputs the position of the tumor by performing a mouse operation, using a keyboard, performing a touch operation, inputting a speech, or the like, and the annotation input unit 33 receives this input (Step S73).

Figure 15A:
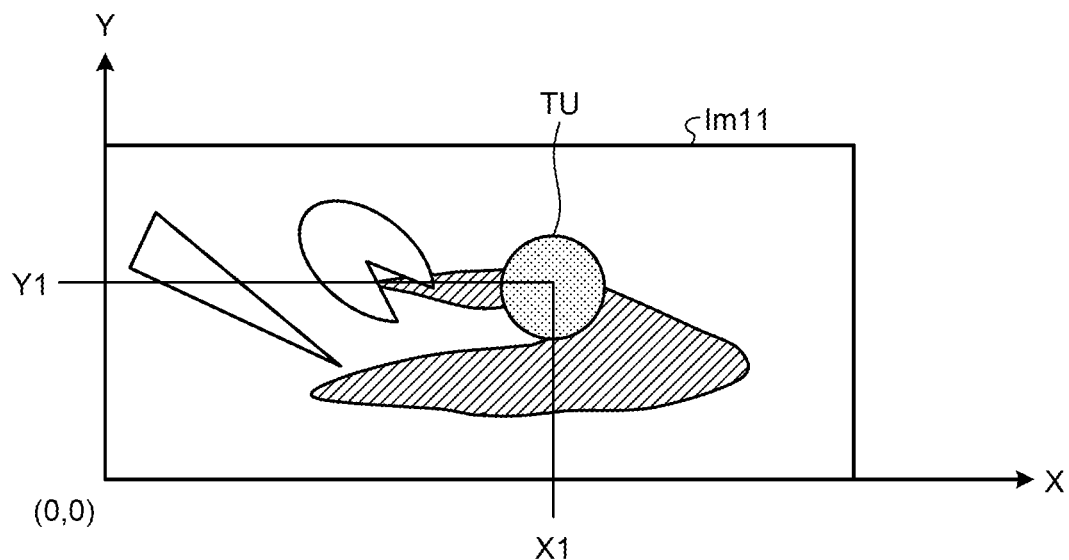
FIG. 15A is a diagram for describing a situation in which an annotation result is added to first image data and second image data.
Figure 15B:
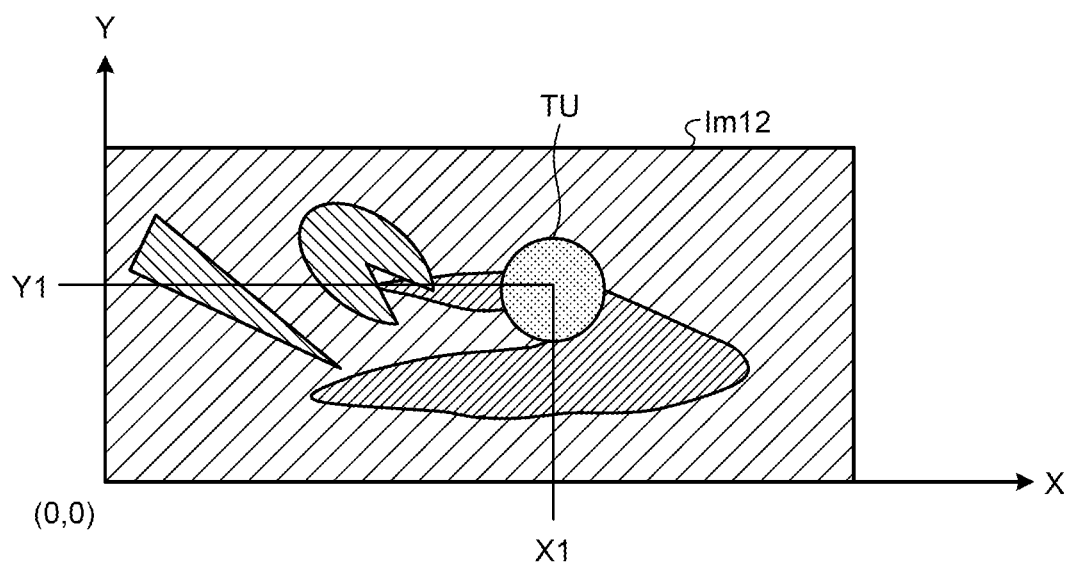
FIG. 15B is a diagram for describing the situation in which the annotation result is added to the first image data and the second image data.

FIGS. 15A and 15B are diagrams for describing a situation in which an annotation result is added to the first image data and the second image data. As illustrated in FIG. 15A, the user confirms a display image Im11 and inputs coordinates (X1, Y1) of the tumor TU. Position information indicating the coordinates is added to the image data (second image data) of the display image Im11 as the annotation result.

Thereafter, the control unit 41 determines whether or not a predetermined operation input indicating that the annotation for this image has ended has been performed (Step S74). In a case where the control unit 41 determines that the predetermined operation input indicating that the annotation for this image has ended has not been performed (Step S74: No), the processing returns to Step S72, and the annotation for this image is continued.

On the other hand, in a case where the control unit 41 determines that the predetermined operation input indicating that the annotation for this image has ended has been performed (Step S74: Yes), the recording control unit 40 records the annotation result as metadata for an image file (Step S75). Then, the adding unit 34 adds the annotation result (metadata) to the image data of the display image Im11. Specifically, in the image file Fa1 illustrated in FIG. 3A, the metadata as the annotation result is recorded in the block Ba2 in association with the display image data recorded in the block Ba1.

Then, the reflection unit 35 reflects the annotation result in the image data (first image data) of the corresponding AI image (raw image) (Step S76). Specifically, as illustrated in FIG. 15B, the annotation result (the position information of the tumor TU) added to the display image Im11 is reflected in the AI image Im12, and the annotation result (the position information of the tumor TU) is added to the image data of the AI image Im12.

Then, the recording control unit 40 records the annotation result as metadata for an image file (Step S77). Then, the adding unit 34 adds the annotation result (metadata) to the image data of the AI image Im12. Specifically, in the image file Fa1 illustrated in FIG. 3A, the metadata as the annotation result is recorded in the block Ba4 in association with the AI image data Im12 recorded in the block Ba3.

Subsequently, the training data generation unit 36 generates training data by using the AI image to which the annotation result is added (Step S78). The training data is a training image group used when the learning device 4 performs machine learning, and is an image data group to which the position information of the tumor TU which is the annotation result is added. That is, the training data is generated by accumulating a large number of image files as illustrated in FIGS. 3A to 3C.

Thereafter, the control unit 41 determines whether or not a predetermined operation input indicating that the annotation has ended has been performed (Step S79). In a case where the control unit 41 determines that the predetermined operational input indicating that the annotation has ended has not been performed (Step S79: No), the processing returns to Step S71.

On the other hand, in a case where the control unit 41 determines that the predetermined operation input indicating that the annotation has ended has been performed (Step S79: Yes), a series of processing ends.

According to the first modified example described above, since the annotation result added to the display image subjected to image processing is reflected in the AI image (raw image), it is possible to generate the training data by using the AI image to which the annotation result is added. As a result, the learning device 4 can generate a highly reliable and highly accurate inference model by using such training data.

As described above, a human such as a doctor or an expert rapidly forms a large amount of annotation with high workability based on easy visual recognition by using an image with high visibility suitable for a visual characteristic of humans, and an image holding original information like an associated raw image is used as training data. Therefore, it is possible to perform learning with high accuracy by using abundant information. Since an inference model obtained by such learning performs inference in accordance with the annotation result by receiving raw data, it is possible to perform inference with high accuracy. Therefore, as information corresponding to the inference result is reflected in a related display image and displayed, an operator and an observer can consider a highly accurate inference result. With this determination, the following observation, treatment, or the like can be appropriately performed.

Second Modified Example

Next, an observation system according to a second modified example will be described. Since a configuration of the observation system according to the second modified example may be similar to the configuration of the second embodiment illustrated in FIG. 6, a description thereof will be omitted.

Figure 16:
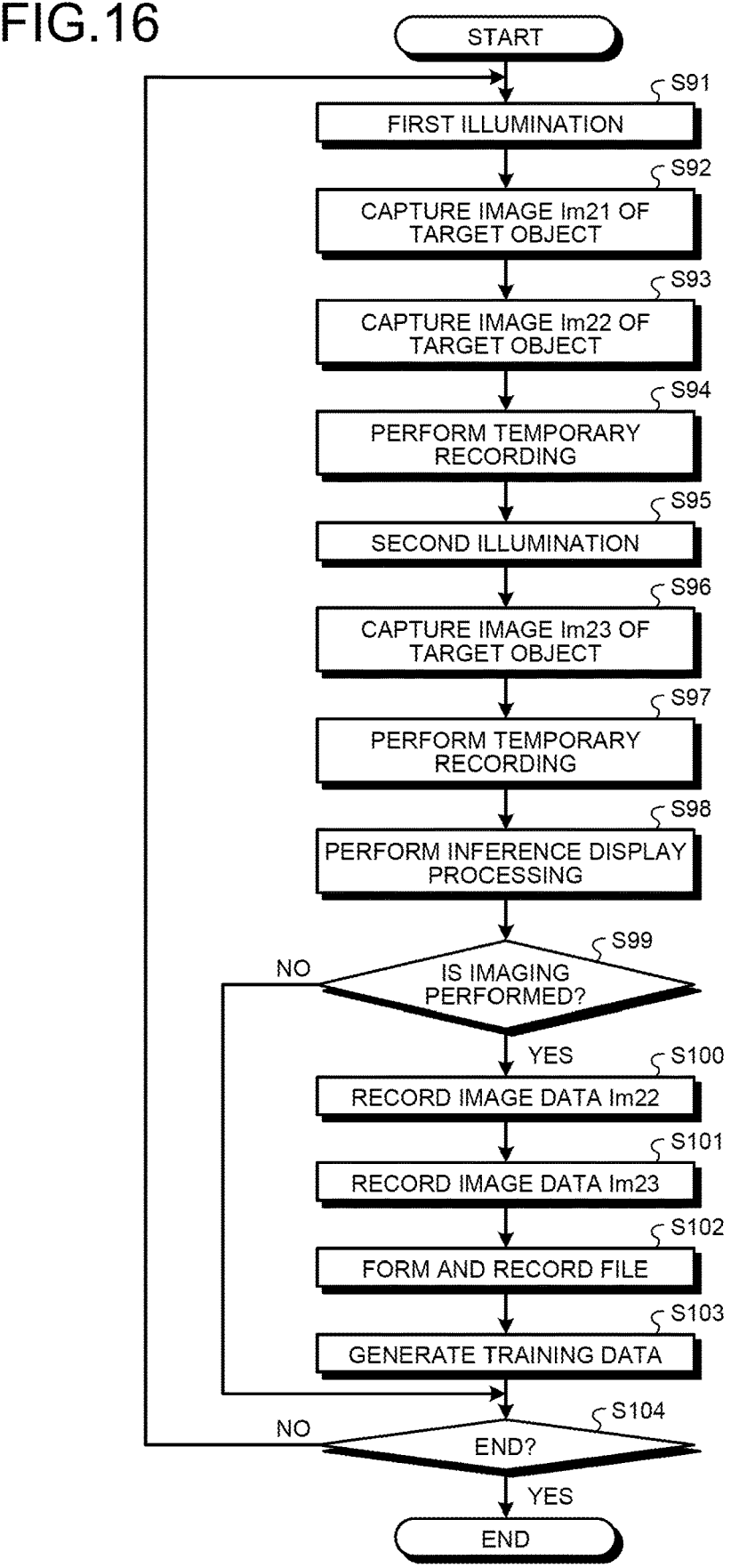
FIG. 16 is a flowchart illustrating an outline of processing performed by an observation system according to a second modified example when generating training data.

FIG. 16 is a flowchart illustrating an outline of processing performed by the observation system according to the second modified example when generating training data. As illustrated in FIG. 16, first, the first illumination unit 12 irradiates an observation target with normal light (Step S91).

Then, the first imaging unit 14 images the observation target (Step S92). Image data generated by this imaging is hereinafter referred to as image data Im21.

Furthermore, the first imaging unit 14 images the observation target again (Step S93). Image data generated by this imaging is hereinafter referred to as image data Im22. An example in which imaging of the normal light observation is performed twice in order to make the number of times imaging of the normal light observation is performed larger than the number of times imaging of the special light observation is performed to secure a frame rate of the normal light observation has been described here, but the number of times the imaging of the normal light observation is performed is not particularly limited.

Thereafter, the recording control unit 170 temporarily records the image data Im21 and the image data Im22 in the recording unit 168 (Step S94). Specifically, the image data Im21 and the image data Im22 are recorded in a ring buffer of the recording unit 168, and image data of one frame is recorded in chronological order. Then, once image data of a predetermined number of frames is recorded, the ring buffer of the recording unit 168 records new image data of a predetermined number of frames in chronological order by deleting the oldest image data and recording the latest image data.

Subsequently, the second illumination unit 13 irradiates the observation target with special light (Step S95).

Then, the second imaging unit 15 images the observation target (Step S96). Image data generated by this imaging is hereinafter referred to as image data Im23.

Thereafter, the recording control unit 170 temporarily records the image data Im23 in the recording unit 168 (Step S97). Specifically, the image data Im23 is recorded in the ring buffer of the recording unit 168.

Then, the image processing device 16 estimates the position of the tumor in the image data Im22 and performs inference display processing of causing the display device 18 to display the position (Step S98). Specifically, the estimation unit 169 estimates the position of the tumor included in the image data Im23 (first image data) of special light observation by using the inference model generated by the learning device 17 by machine learning. Then, the reflection unit 165 reflects and gives the position information of the tumor in and to the image data Im22 (second image data). Then, the display control unit 167 highlights the position of the tumor in the image data Im22 and displays the same on the display device 18.

Subsequently, the control unit 171 determines whether or not an imaging instruction input has been received (Step S99). The user confirms the position of the tumor in the image data Im22 displayed on the display device 18, and performs an operation input such as pressing an imaging button displayed on the display device 18 in a case where the position of the tumor is correctly displayed and imaging of this image is desired. The control unit 171 determines whether or not this operation input has been performed.

In a case where the control unit 171 determines that there is no imaging instruction input (Step S99: No), the processing proceeds to Step S104. On the other hand, in a case where the control unit 171 determines that there is an imaging instruction input (Step S99: Yes), the recording control unit 170 records the image data Im22 in a non-transitory recording region (for example, a RAM instead of the ring buffer) of the recording unit 168 (Step S100). At this time, the adding unit 164 adds the position information of the tumor estimated by the estimation unit 169 to the image data Im23 as an annotation result and records the image data Im23 to which the annotation result is added in the recording unit 168. However, the adding unit 164 may add, as the annotation result, the position information of the tumor acquired by the annotation input unit 163 receiving a user's input.

Further, the recording control unit 170 records the image data Im23 in a non-transitory recording region (for example, a RAM instead of the ring buffer) of the recording unit 168 (Step S101).

Then, as illustrated in FIG. 3A, the recording control unit 170 records the image data Im22 in the block Ba1 of the image file Fa1, records the image data Im23 in the block Ba3, and records the metadata indicating the position information of the tumor in each of the block Ba2 and the block Ba4, forms a file of the data generated by the series of processing, and records the file in the recording unit 168 (Step S102).

Subsequently, the training data generation unit 166 generates training data by using the image data Im23 of special light observation to which the annotation result is added (Step S103).

Thereafter, the control unit 171 determines whether or not a predetermined operation input indicating that the processing of generating the training data has ended has been performed (Step S104). In a case where the control unit 171 determines that the predetermined operation input indicating that the processing has ended has not been performed (Step S104: No), the processing returns to Step S91.

On the other hand, in a case where the control unit 171 determines that the predetermined operation input indicating that the processing has ended has been performed (Step S104: Yes), the series of processing ends.

According to the second modified example described above, the inference model generated by the learning device 17 by machine learning automatically estimates the position of the tumor by using the image data Im23 of special light observation, and a doctor or an expert can confirm the tumor whose position is estimated from the image data Im22 of normal light observation with which the doctor or expert can easily perform observation. Then, an image confirmed to be a tumor by a doctor or an expert is recorded together with the annotation result. As a result, according to the second modified example, it is possible to easily accumulate a large amount of training data which is an image data group of special light observation to which position information of a tumor is added.

As described above, a human such as a doctor or an expert can intuitively and rapidly perform determination and forms a large amount of accurate annotation by using a natural normal light (white light) image with high visibility suitable for a visual characteristic of humans, and an image holding original information like a special light observation image is used as a large amount of high-quality training data. Therefore, it is possible to perform learning with high accuracy by using abundant information. Since an inference model obtained by such learning performs inference in accordance with the annotation result by receiving image data obtained using special light, it is possible to perform inference with high accuracy. Therefore, as information corresponding to the inference result is reflected in a related display image (corresponding to an image captured by performing irradiation with normal light and white light) and displayed, an operator and an observer can consider a highly accurate inference result. With this determination, the following observation, treatment, or the like can be appropriately performed.

Third Modified Example

Next, an observation system according to a third modified example will be described. Since a configuration of the observation system according to the third modified example may be similar to the configuration of the third embodiment illustrated in FIG. 9, a description thereof will be omitted.

Figure 17:
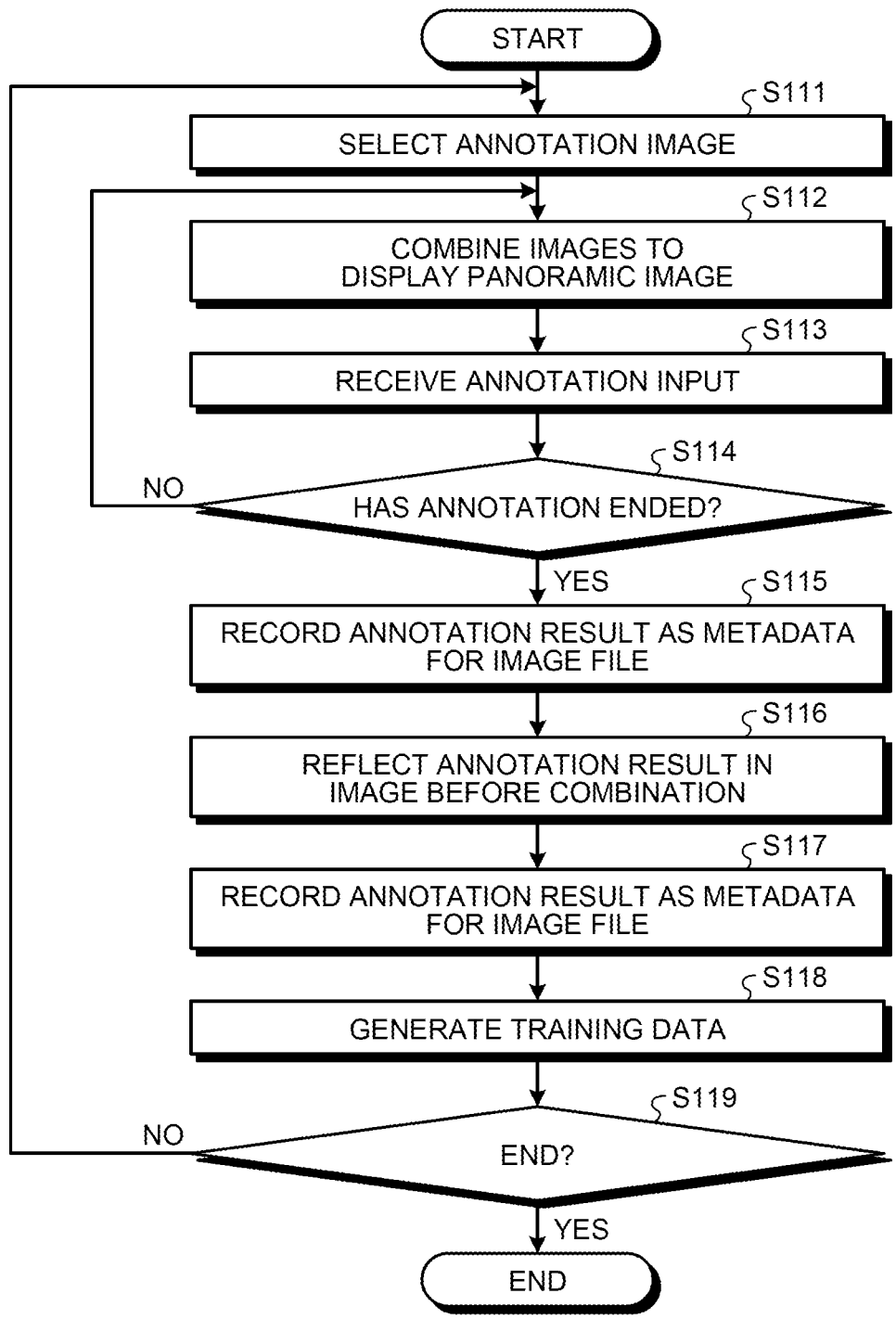
FIG. 17 is a flowchart illustrating an outline of processing performed by an observation system according to a third modified example when generating training data.

FIG. 17 is a flowchart illustrating an outline of processing performed by the observation system according to the third modified example when generating training data. As illustrated in FIG. 17, first, a user selects an image to be annotated among images recorded in the recording unit 562 (Step S111).

Then, the image combining unit 555 combines the selected images to generate a panoramic composite image (second image), and the display control unit 561 causes the display device 57 to display the composite image (Step S112).

Then, the user confirms the composite image and inputs the position of the tumor by performing a mouse operation, using a keyboard, performing a touch operation, inputting a speech, or the like, and the annotation input unit 557 receives the input of the position of the tumor (Step S113).

Figure 18A:
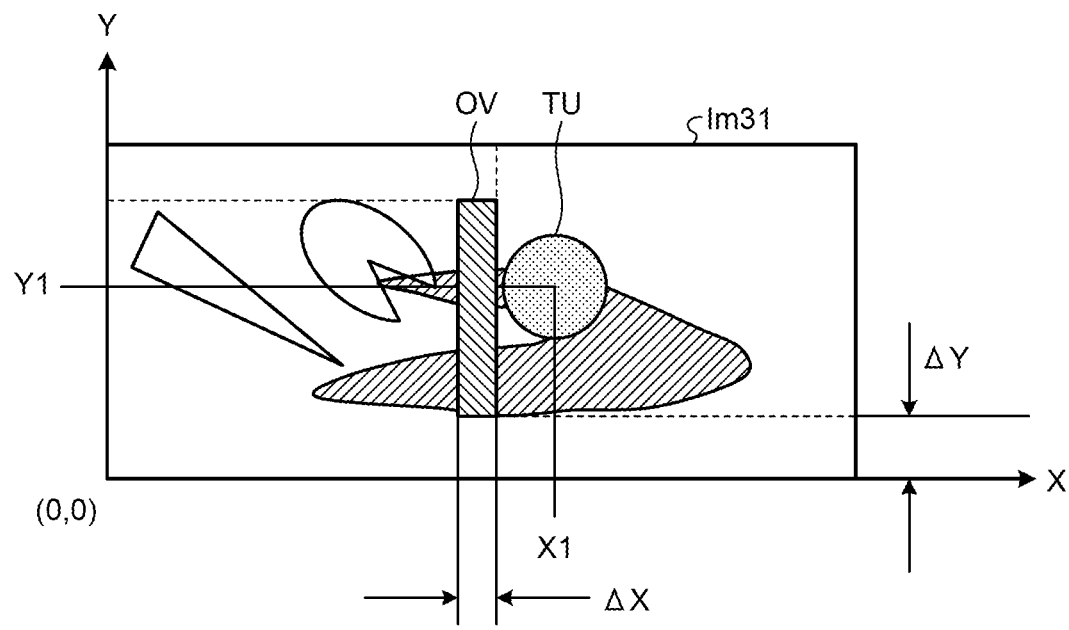
FIG. 18A is a diagram for describing a situation in which an annotation result is added to first image data and second image data.
Figure 18B:
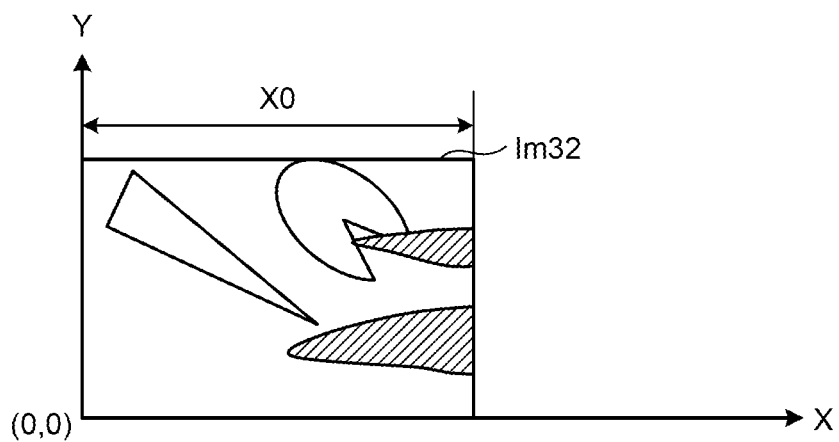
FIG. 18B is a diagram illustrating a situation in which the annotation result is added to the first image data and the second image data.
Figure 18C:
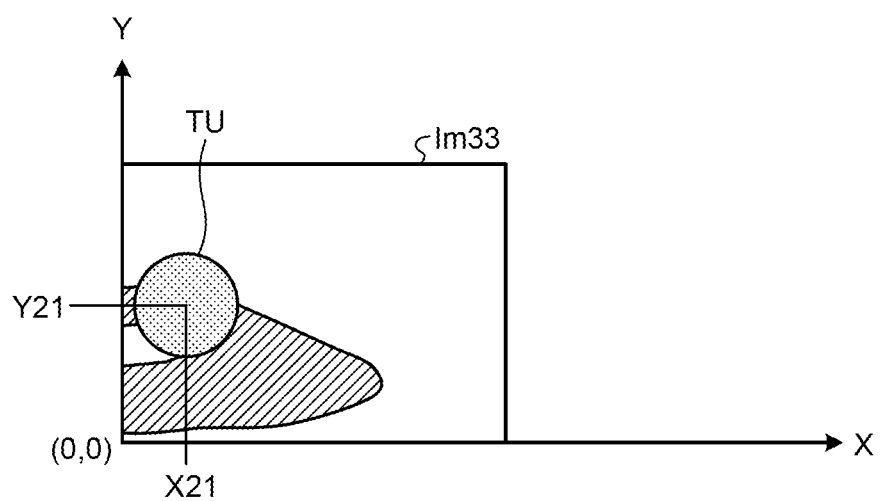
FIG. 18C is a view illustrating a situation in which the annotation result is added to the first image data and the second image data.

FIGS. 18A to 18C are diagrams for describing a situation in which an annotation result is added to the first image data and the second image data. As illustrated in FIG. 18A, a composite image Im31 is an image obtained by combining an image Im32 before combination illustrated in FIG. 18B and an image Im33 before combination illustrated in FIG. 18C with an overlapping portion OV as a margin. The user confirms the composite image Im31 and inputs the coordinates (X1, Y1) of the tumor TU. Position information indicating the coordinates is added to the image data (second image data) of the composite image Im31 as the annotation result.

Thereafter, the control unit 565 determines whether or not a predetermined operation input indicating that the annotation for this image has ended has been performed (Step S114). In a case where the control unit 565 determines that the predetermined operation input indicating that the annotation for this image has ended has not been performed (Step S114: No), the processing returns to Step S112, and the annotation for this image is continued.

On the other hand, in a case where the control unit 565 determines that the predetermined operation input indicating that the annotation for this image has ended has been performed (Step S114: Yes), the recording control unit 564 records the annotation result as metadata for an image file (Step S115). Then, the adding unit 558 adds the annotation result (metadata) to the image data of the composite image Im31 for display. Specifically, in the image file Fa1 illustrated in FIG. 3A, the metadata as the annotation result is recorded in the block Ba2 in association with the display image data (composite image Im31) recorded in the block Ba1.

Then, the reflection unit 559 reflects the annotation result in the image data (first image data) of the corresponding image before combination (Step S116). Specifically, as illustrated in FIGS. 18B and 18C, the annotation result (the position information of the tumor TU) added to the composite image Im31 is reflected in the image Im32 before combination and the image Im33 before combination, and the annotation result (the position information of the tumor TU) is added to the image data of the image Im32 before combination and the image Im33 before combination. At this time, the coordinate calculation unit 556 calculates the coordinates of the tumor TU in the image Im32 before combination and the image Im33 before combination. The coordinates (X21, Y21) of the tumor in the image Im33 before combination can be calculated as $X21=X1-X0+\Delta X$, and $Y21=Y1-\Delta Y$, by using the coordinates (X1, Y1) of the tumor in the composite image, the width $\Delta X$ of the overlapping portion OV in an X-axis direction (see FIG. 18A), the width X0 of the image Im32 before combination in the x-axis direction, and the positional deviation $\Delta Y$ between the image Im32 before combination and the image Im33 before combination in the Y-axis direction (see FIG. 18A).

Then, the recording control unit 564 records the annotation result as metadata for an image file (Step S117). Then, the adding unit 558 adds the annotation result (metadata) to the image data of the image Im32 before combination and the image Im33 before combination.

Figure 19:
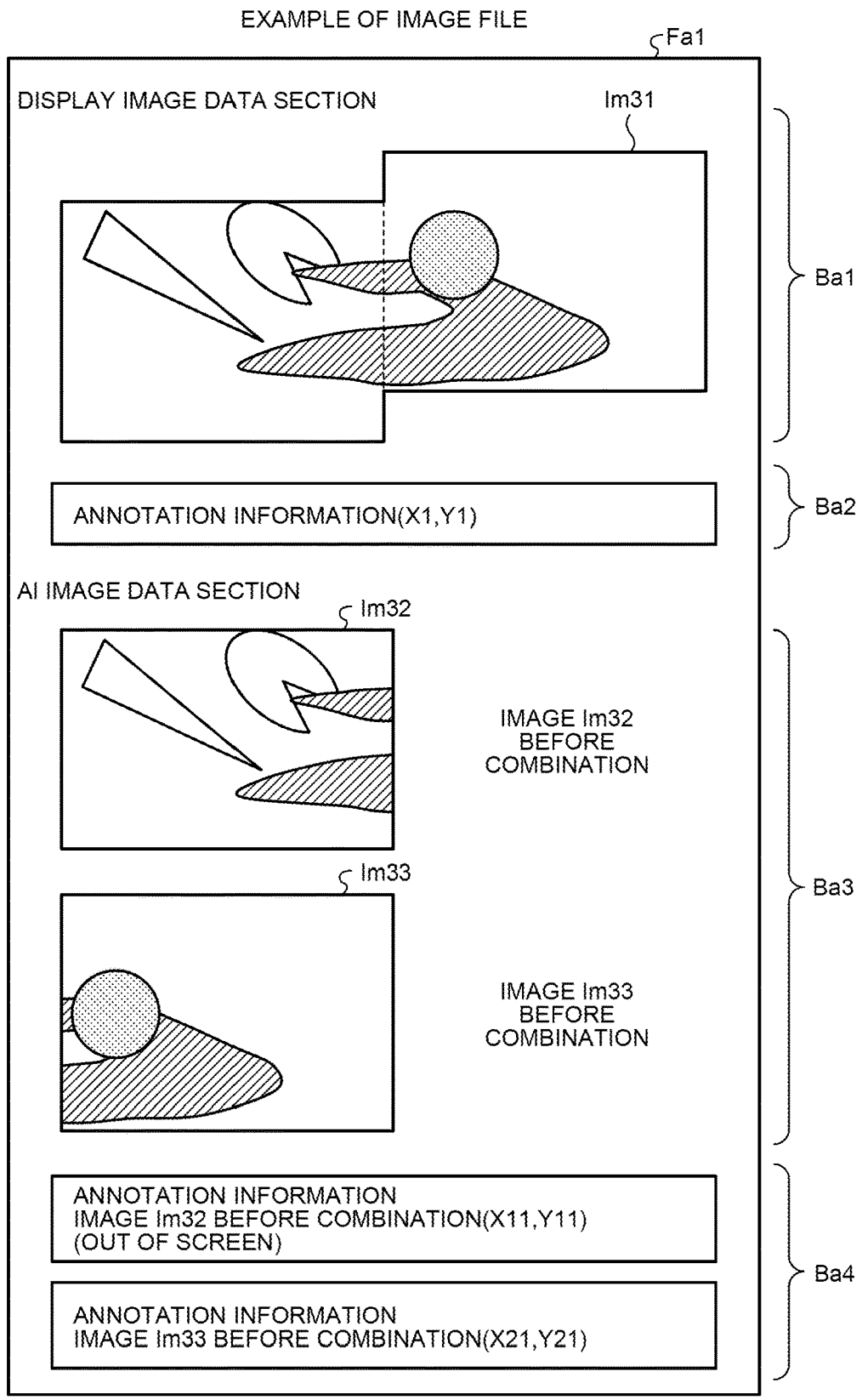
FIG. 19 is a diagram illustrating an example of an image file serving as the training data.

FIG. 19 is a diagram illustrating an example of an image file serving as the training data. In the image file Fa1 illustrated in FIG. 19, the image data of the composite image Im31 is recorded in the block Ba1, and the coordinates (X1, Y1) of the tumor in the composite image Im31 is recorded in the block Ba2 as the annotation information.

The composite image Im31 is an image with which it is relatively easy to understand the entire image including the periphery although it is an image of a specific portion, and is an image that can easily be annotated by an expert who is familiar with a tissue structure of the tumor in an easy-to-understand manner.

On the other hand, AI (artificial intelligence) can perform determination only with a pattern of undulation of tissues such as blood vessels in the tumor itself even in a case where there is no information on the periphery, so that the individual image before combination is used as a training image. That is, the image data Im32 before combination and the image Im33 before combination are recorded in the block Ba3, and the coordinates after combination added by a human are recalculated as the coordinates (X11, Y11) (that are out-of-screen coordinates because the tumor is outside the image Im32 before combination) and coordinates (X21, Y21) of the tumor in the image data Im32 before combination and the image Im33 before combination and used as the training image. This is a step of replacing an annotation added by a human with an image for a machine recorded in association. The converted coordinates are recorded as the annotation information in the block Ba4. At this time, although FIG. 19 illustrates an example of adding metadata indicating "out-of-screen", in a case where the origin (0,0) for the in-screen coordinates is the lower-right corner, the range of the screen is set to, for example, (X100, Y100), and is described as "screen range information metadata", and in a case where the annotation position is out of the range or the coordinate value is a negative value, information indicating "out-of-screen" can be obtained. In a case where the out-of-screen information can also be the annotation information in this way, it is possible to create training data for searching for a tumor outside the screen when the tumor is not inside the screen. Such training data for out-of-screen learning can also be easily created by an expert in the third modified example, and an inference model trained using the training data can provide a guide display function for notifying that there is a tumor outside the screen, for example, even in a case where a doctor does not accidentally set the imaging range around the tumor. It is possible to provide an inference model that can prevent a lesion or the like that is likely to occur in a specific tissue from missing. The application of the inference model is not limited to the inside of the body, and the inference model can similarly predict an event (a location of matsutake mushrooms in a pine forest, a location of a portion that can be easily cracked in a building, or the like) that can occur under a specific environment or situation based on the features of the image even in a case where the event is not in the imaging range.

Subsequently, the training data generation unit 560 generates training data by using the image data Im32 before combination and the image Im33 before combination to which the annotation result is added (Step S118). Although the composite image enables grasping of the entire image, the composite image includes information on a much wider region than the tumor portion as a ratio, and thus, there is a possibility that noise is generated when the feature of the image of the tumor is learned. However, with such a configuration, learning of a characteristic difference between the tumor portion and a tissue of a portion other than the tumor is more accurately performed.

Thereafter, the control unit 565 determines whether or not a predetermined operation input indicating that the annotation has ended has been performed (Step S119). In a case where the control unit 565 determines that the predetermined operational input indicating that the annotation has ended has not been performed (Step S119: No), the processing returns to Step S111.

On the other hand, in a case where the control unit 565 determines that the predetermined operation input indicating that the annotation has ended has been performed (Step S119: Yes), a series of processing ends.

As described above, the third modified example is disclosed as the recording method of creating and recording an image file including annotation coordinate information as metadata, and it is possible to perform image combining processing to display a plurality of pieces of image data obtained by imaging an observation target on the display unit, acquire annotation coordinate information on a display image of composite image data displayed on the display unit, add the annotation coordinate information to individual image data constituting the composite image data displayed on the display unit, create an image file including the annotation coordinate information for the individual image data as metadata. Since out-of-screen coordinate information as the annotation coordinate information for the individual image data is included as the metadata, it is possible to provide the observation device and the observation method that prevent a target object outside a screen from missing.

According to the third modified example described above, since an annotation result added to a composite image is reflected in an image before combination, training data can be generated using the image before combination to which the annotation result is added. As a result, the learning device 56 can generate a highly reliable and highly accurate inference model by using such training data.

As described above, a human such as a doctor or an expert can intuitively and rapidly perform determination and forms a large amount of accurate annotation by using a natural composite image with high visibility suitable for a visual characteristic of humans, and an image holding original information like an image before combination is used as a large amount of high-quality training data. Therefore, it is possible to perform learning with high accuracy by using abundant information. Since an inference model obtained by such learning performs inference in accordance with the annotation result by receiving image data of the image before combination, it is possible to perform inference with high accuracy. Therefore, as information corresponding to the inference result is reflected in a related display image (composite image) and displayed, an operator and an observer can consider a highly accurate inference result.

With this determination, the following observation, treatment, or the like can be appropriately performed.

Fourth Modified Example

Next, an observation system according to a fourth modified example will be described. Since a configuration of the observation system according to the fourth modified example may be similar to the configuration of the third embodiment illustrated in FIG. 9, a description thereof will be omitted.

FIG. 20 is a flowchart illustrating an outline of processing performed by the observation system according to the fourth modified example when generating training data. The example described with reference to FIG. 20 is a case where the entire observation target cannot be imaged by the first imaging unit 53, and the entire observation target can be observed by combining images captured by the first imaging unit 53 and the second imaging unit 54 into a panoramic image. In a case where the entire observation target can be imaged by the first imaging unit 53, it is sufficient if one imaging unit is used, and in a case where the entire observation target cannot be imaged even in a case of combining the images captured by the first imaging unit 53 and the second imaging unit 54, three or more imaging units may be used.

As illustrated in FIG. 20, the control unit 565 causes the first imaging unit 53 to image the observation target (Step S131). Note that the control unit 565 always causes the illumination unit 52 to irradiate the observation target with the illumination light when performing imaging. Hereinafter, an image captured by the first imaging unit 53 is referred to as a first image.

At this time, the guiding unit 553 may guide the position of the first imaging unit 53. Specifically, in a case where a distance between the first imaging unit 53 and the observation target is not appropriate, the guiding unit 553 guides the position of the first imaging unit 53 by displaying a text message such as "please move closer" or "please move further away" on the display device 57. Furthermore, in a case where the distance between the first imaging unit 53 and the observation target is appropriate and the entire observation target cannot be imaged, the guiding unit 553 may cause the display device 57 to display a text message such as "it is in focus, but there is a continuation of the affected region", so that an imaging unit may be added to expand the imaging range. Note that the guiding unit 553 may perform the above-described guiding by outputting a message by voice. Hereinafter, a case where the second imaging unit 54 is added will be described.

Subsequently, the control unit 565 causes the second imaging unit 54 to image the observation target (Step S132). Hereinafter, an image captured by the second imaging unit 54 is referred to as a second image.

At this time, the guiding unit 553 may guide the position of the second imaging unit 54. Specifically, in a case where the distance between the first imaging unit 53 and the observation target and a distance between the second imaging unit 54 and the observation target are too different to combine the images, the guiding unit 553 guides the position of the second imaging unit 54 by causing the display device 57 to display a text message such as "please move the second imaging unit closer" or "please move the second imaging unit further away". Note that the guiding unit 553 may perform the above-described guiding by outputting a message by voice.

Then, the determination unit 554 determines whether or not the first image and the second image can be combined (Step S133). Specifically, the determination unit 554 extracts a feature point (a characteristic point of the image such as an edge portion of a lesion or bleeding point) included in the first image and a feature point included in the second image by image processing, and determines whether or not there is an overlapping portion by comparing the positions of the feature points. Then, the determination unit 554 determines whether or not there is an overlapping portion, whether or not the first image and the second image are in focus, and the like, and determines whether or not the first image and the second image can be combined.

In a case where the determination unit 554 determines that the first image and the second image cannot be combined (Step S133: No), the guiding unit 553 displays a combining guide on the display device 57 (Step S134). Specifically, the guiding unit 553 causes the display device 57 to display a text message for guiding the position of the second imaging unit 54 as described above. Thereafter, the processing returns to Step S132. Note that the guiding unit 553 may display a text message for guiding the position of the first imaging unit 53 on the display device 57, and in this case, the processing returns to Step S131. Furthermore, the guiding unit 553 may guide the positions of both the first imaging unit 53 and the second imaging unit 54, and also in this case, the processing returns to Step S131.

On the other hand, in a case where the determination unit 554 determines that the first image and the second image can be combined (Step S133: Yes), the image combining unit 555 combines the first image and the second image into a panoramic image (Step S135). At this time, the guiding unit 553 may cause the display device 57 to display a text message such as "combined display is possible" to notify that the first image and the second image can be combined. Then, the image combining unit 555 generates a composite image obtained by combining the first image and the second image. It is assumed that the composite image includes the entire observation target.

Subsequently, the determination unit 554 determines whether or not illumination adjustment is necessary (Step S136). Specifically, the determination unit 554 determines whether or not the first image or the second image has illumination unevenness based on luminance distributions of the first image and the second image.

In a case where the determination unit 554 determines that the illumination adjustment is not necessary (Step S136: No), the processing proceeds to Step S138. On the other hand, in a case where the determination unit 554 determines that the illumination adjustment is necessary (Step S136: Yes), the control unit 565 performs uniform illumination control and image processing correction (Step S137). Specifically, under the control of the control unit 565, in order to reduce the illumination unevenness of the first image or the second image and to make the illumination with which the observation target is irradiated uniform (uniform illumination control), the guiding unit 553 may cause the display device 57 to display a text message such as "there is illumination unevenness", so that an illumination unit different from the illumination unit 52 is added to eliminate the illumination unevenness. Then, when the illumination unit that irradiates the observation target with illumination light is added by a doctor or the like, the illumination unevenness of the first image or the second image is reduced, and the illumination becomes uniform. At this time, the guiding unit 553 may guide the position to which the illumination is to be added by a text or speech. Furthermore, the guiding unit 553 may guide the position of the illumination unit 52 or a direction in which the illumination light is to be emitted by a text or speech. The image processor 552 may add correction (image processing correction) to the image processing in order to reduce the illumination unevenness of the first image or the second image under the control of the control unit. Specifically, the image processor 552 increases a gain of a pixel having a small luminance and decreases a gain of a pixel having a large luminance for the first image or the second image to reduce the illumination unevenness of the first image or the second image and obtain an image with uniform illumination.

Thereafter, the determination unit 554 determines whether or not re-correction of the composite image is necessary (Step S138). Specifically, the determination unit 554 determines whether or not the composite image is blurred, whether or not there is illumination unevenness, or the like, and determines whether or not re-correction of the composite image is necessary based on the determination result.

In a case where the determination unit 554 determines that re-correction of the composite image is necessary (Step S138: Yes), the processing returns to Step S131. On the other hand, in a case where the determination unit 554 determines that re-correction of the composite image is not necessary (Step S138: No), the image processing device 55 estimates the position of the tumor in the composite image and performs inference display processing of causing the display device 57 to display the position (Step S139). Specifically, the estimation unit 563 estimates the position of the tumor included in the first image and the second image (first image data) by using the inference model generated by the learning device 56 by machine learning. Then, the reflection unit 559 reflects and adds the position information of the tumor in and to the composite image (second image data). Then, the display control unit 561 highlights the position of the tumor in the composite image and displays the same on the display device 57.

Subsequently, the control unit 565 determines whether or not an imaging instruction input has been received (Step S140). The user confirms the position of the tumor in the composite image displayed on the display device 57, and performs an operation input such as pressing an imaging button displayed on the display device 57 in a case where the position of the tumor is correctly displayed and imaging of this image is desired. The control unit 565 determines whether or not this operation input has been performed. At this time, the adding unit 558 adds the position information of the tumor estimated by the estimation unit 563 to the first image and the second image as the annotation result and records the first image and the second image to which the annotation result is added in the recording unit 562. However, the adding unit 558 may add, as the annotation result, the position information of the tumor acquired by the annotation input unit 557 receiving a user's input.

In a case where the control unit 565 determines that there is no imaging instruction input (Step S140: No), the processing proceeds to Step S146. On the other hand, in a case where the control unit 565 determines that there is an imaging instruction input (Step S140: Yes), the recording control unit 564 records the composite image subjected to the above-described uniform illumination control and image processing correction in the recording unit 562 (Step S141).

Subsequently, the control unit 565 eliminates the illumination unit added for the uniform illumination, or returns the position of the illumination unit 52 or the direction in which the illumination light is emitted to the original position or direction (Step S142).

Then, the recording control unit 564 records the first image and the second image in the recording unit 562 (Step S143). The reason why imaging is performed in a state where illumination is not uniform as described above is that training data captured in a state where illumination is not uniform is required in order to generate an inference model capable of estimating the position of a tumor even when searching for the tumor without making the illumination uniform.

Furthermore, as illustrated in FIG. 3A, the recording control unit 564 records the composite image subjected to the uniform illumination control and image processing correction in the block Ba1 of the image file Fa1, records the first image and the second image in the block Ba3, and records metadata representing the position information of the tumor in each of the blocks Ba2 and Ba4, and forms and records a file of data generated by the series of processing in the recording unit 562 (Step S144).

Subsequently, the training data generation unit 560 generates the training data by using the first image and the second image to which the annotation result is added (Step S145).

Thereafter, the control unit 565 determines whether or not a predetermined operation input indicating that the series of processing of generating the training data has ended has been performed (Step S146). In a case where the control unit 565 determines that the predetermined operation input indicating that the series of processing has ended has not been performed (Step S146: No), the processing returns to Step S137.

On the other hand, in a case where the control unit 565 determines that the predetermined operation input indicating that the series of processing has ended has been performed (Step S146: Yes), the series of processing ends.

According to the fourth modified example described above, the inference model generated by the learning device 56 by machine learning automatically estimates the position of the tumor by using the first image and the second image before combination, and a doctor or an expert can confirm the tumor whose position is estimated from the composite image with which the doctor or expert can easily perform observation. Then, an image confirmed to be a tumor by a doctor or an expert is recorded together with the annotation result. As a result, according to the fourth modified example, it is possible to easily accumulate a large amount of training data which is an image data group before combination to which position information of a tumor is added.

As described above, a human such as a doctor or an expert can intuitively and rapidly perform determination and forms a large amount of accurate annotation by using a natural composite image with high visibility suitable for a visual characteristic of humans, and an image holding original information like an image before combination is used as a large amount of high-quality training data (here, corresponding to images before combination since processing such as uniform illumination control or image processing is not performed). Therefore, it is possible to perform learning with high accuracy by using abundant information. Since the number of images before combination is larger than the number of images after combination, a large number of images can be used as training data. Since an inference model obtained by such learning performs inference in accordance with the annotation result by receiving image data of the image before combination, it is possible to perform inference with high accuracy. Therefore, as information corresponding to the inference result is reflected in a related display image (composite image) and displayed, an operator and an observer can consider a highly accurate inference result. With this determination, the following observation, treatment, or the like can be appropriately performed.

Various embodiments can be formed by appropriately combining a plurality of constituent elements disclosed in the training data generation device according to an embodiment of the present disclosure described above. For example, some constituent elements may be deleted from all the constituent elements described in the training data generation device according to the embodiment of the present disclosure described above. Furthermore, the constituent elements described in the training data generation device according to the embodiment of the present disclosure described above may be appropriately combined. In addition, although an example in which an endoscope is taken as an example on the assumption of medical use has been described here, a portion written as the endoscope can be replaced with a camera including an optical system and an imaging unit. It is possible to apply the present disclosure to an in-vehicle camera, a monitoring camera, an agricultural camera, or the like in order to detect the same target object under different imaging conditions such as daylight, illumination light, and infrared light. In addition, the present disclosure can also be applied to a microscope having an imaging function. In addition to such industrial applications, the present disclosure can also be applied to learning and inference for daily life images and scientific images. In addition, in a case of a camera such as a single-lens reflex, the imaging unit and the optical system can be separated by an interchangeable lens, and a portion written as an endoscope can be replaced with an imaging unit or an imaging device.

Furthermore, in the training data generation device according to an embodiment of the present disclosure, the "unit" described above can be replaced with "means", "circuit", or the like. For example, the control unit can be replaced with control means or a control circuit.

In addition, a program executed by the training data generation device according to an embodiment of the present disclosure is provided by being recorded as file data in an installable format or an executable format in a computer-readable recording medium such as a CD-ROM, a flexible disk (FD), a CD-R, a digital versatile disk (DVD), a USB medium, or a flash memory.

In addition, the program executed by the training data generation device according to an embodiment of the present disclosure may be stored on a computer connected to a network such as the Internet and provided by being downloaded via the network.

Note that, in the description of the flowcharts in the present specification, the context of processing between steps is clearly indicated using expressions such as "first", "thereafter", and "subsequently", but the order of processing necessary for implementing the disclosure is not uniquely determined by these expressions. That is, the order of processing in the flowcharts described in the present specification can be changed within a range without inconsistency. In addition, the disclosure is not limited to such a program including simple branch processing, and branching may be made by comprehensively determining more determination items. In this case, a technology of artificial intelligence that performs machine learning while prompting a user to perform manual operation to repeat learning may be used in combination. In addition, operation patterns of many experts may be learned, and deep learning may be performed in a form in which more complicated conditions are added.

According to the disclosure, it is possible to provide a training data generation device, a training data generation method, a recording device, and a recording method for generating training data that enable highly accurate image determination by AI based on an image determined with visual recognition by a human.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A training data generation device comprising
   a computer, and
   a non-transitory computer-readable storage medium,
   the computer being configured to:
   receive an input of an annotation for second image data obtained by imaging an observation target;
   reflect a result of the annotation in first image data that is related to the same observation target as the observation target of the second image data, the first image data having a different at least one of imaging mode and display mode from the second image data; and
   generate training data for creating an inference model by using the first image data and the result of the annotation reflected in the first image data,
   the first image data including image data of a plurality of images, and
   the second image data being image data of an image obtained by combining the plurality of images included in the first image data,
   wherein the plurality of images are images captured by different imaging units at different positions,
   wherein the image file includes out-of-screen coordinate information as the metadata, the out-of-screen coordinate information serving as the annotation coordinate information for the individual image data.

2. The training data generation device according to claim 1, wherein the second image data is image data to be displayed on a display when the annotation is performed on the second image data.

3. The training data generation device according to claim 2, wherein the different imaging mode is processing for improving visibility when displaying on the display.

4. The training data generation device according to claim 1,
   wherein the first image data is image data of a raw image, and
   the second image data is image data of an image obtained by performing image processing on the raw image.

5. The training data generation device according to claim 4, wherein the image processing includes at least one of gamma correction, white balance adjustment, color correction, noise reduction, and image enhancement processing.

6. The training data generation device according to claim 1,
   wherein the first image data is image data of an image captured in a state where the observation target is irradiated with special observation light, and
   the second image data is image data of an image captured in a state where the observation target is irradiated with illumination light.

7. The training data generation device according to claim 1, the computer is further configured to calculate coordinates of an image included in the first image data or the second image data.

8. A recording method comprising:
   performing image combining processing to display, on a display, a plurality of pieces of image data obtained by imaging an observation target;
   acquiring annotation coordinate information on a display image of composite image data displayed on the display;
   adding the annotation coordinate information to individual image data constituting the composite image data displayed on the display;
   creating an image file including the annotation coordinate information for the individual image data as metadata; and
   recording the created image file,
   wherein the plurality of images are images captured by different imaging units at different positions,
   wherein the image file includes out-of-screen coordinate information as the metadata, the out-of-screen coordinate information serving as the annotation coordinate information for the individual image data.

9. An inference device comprising:
   a non-transitory computer-readable storage medium storing a trained model that has been trained using training data; and
   a computer configured to:
   receive an input of an annotation for second image data obtained by imaging an observation target;
   reflect a result of the annotation in first image data that is related to the same observation target as the observation target of the second image data, the first image data having a different at least one of imaging mode and display mode from the second image data;
   generate training data for creating an inference model by using the first image data and the result of the annotation reflected in the first image data; and
   perform inference processing on first image data based on the trained model that has been trained using the training data generated,
   the first image data including image data of a plurality of images, and
   the second image data being image data of an image obtained by combining the plurality of images included in the first image data,
   wherein the plurality of images are images captured by different imaging units at different positions,
   wherein the image file includes out-of-screen coordinate information as the metadata, the out-of-screen coordinate information serving as the annotation coordinate information for the individual image data.

* * * * *